Figure 11:
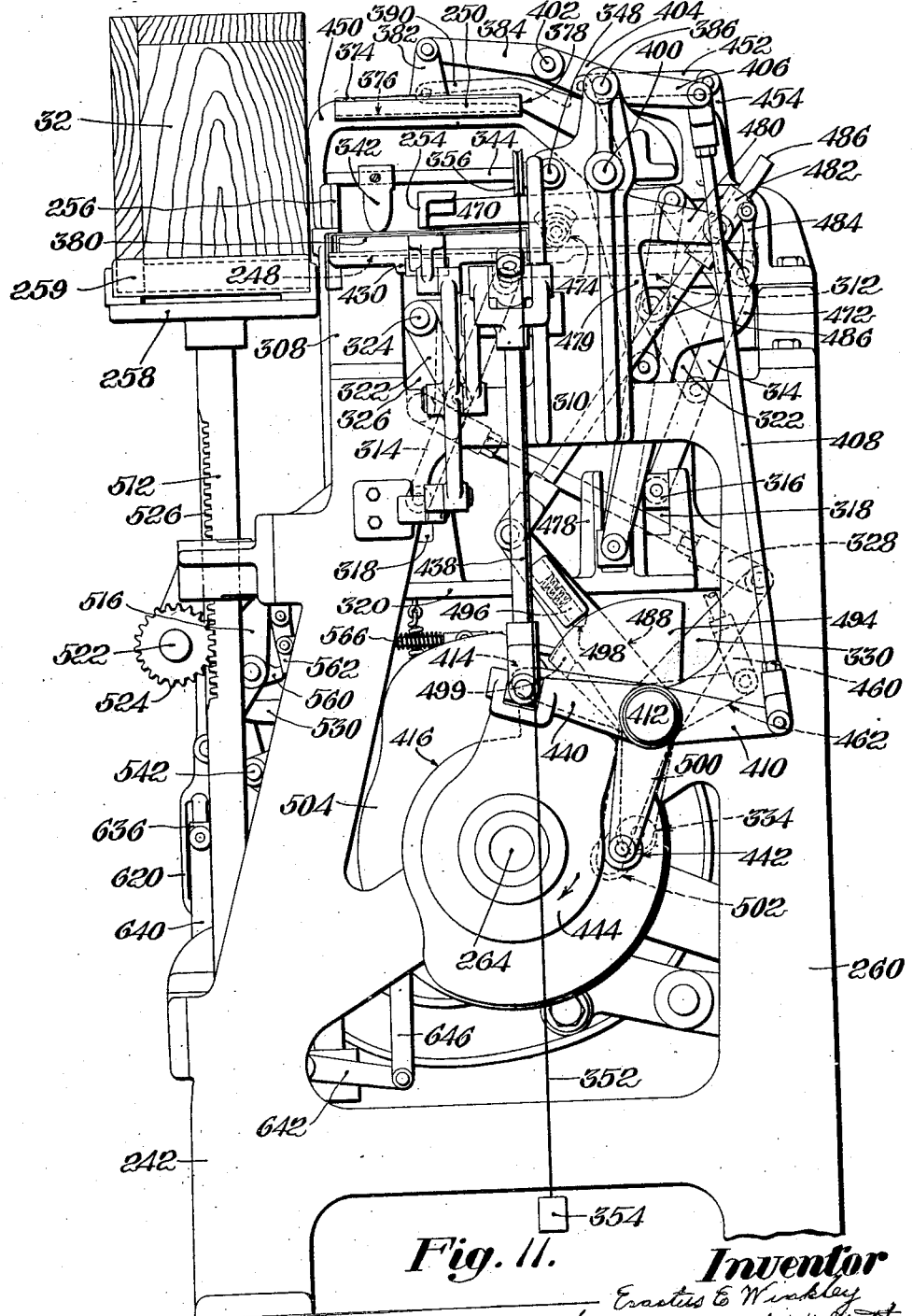

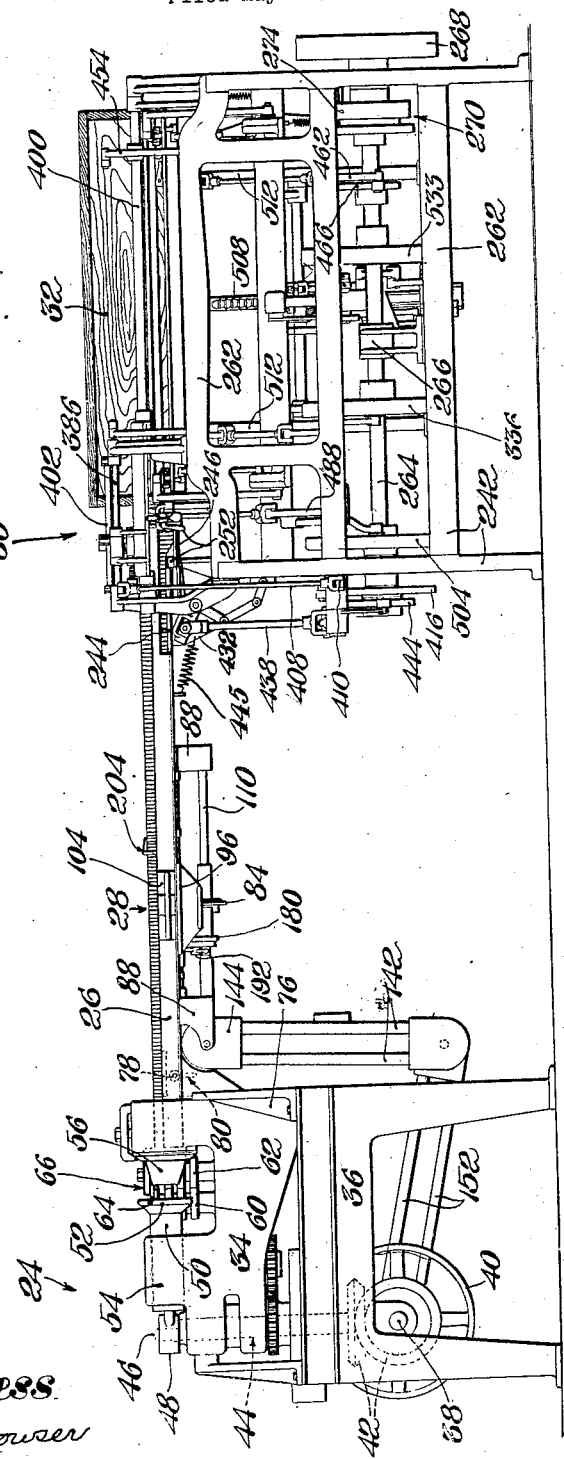

Aug. 24, 1926.  
E. E. WINKLEY  
STOCK HANDLING MACHINE  
Filed May 26, 1920
1,596,914
9 Sheets-Sheet 2
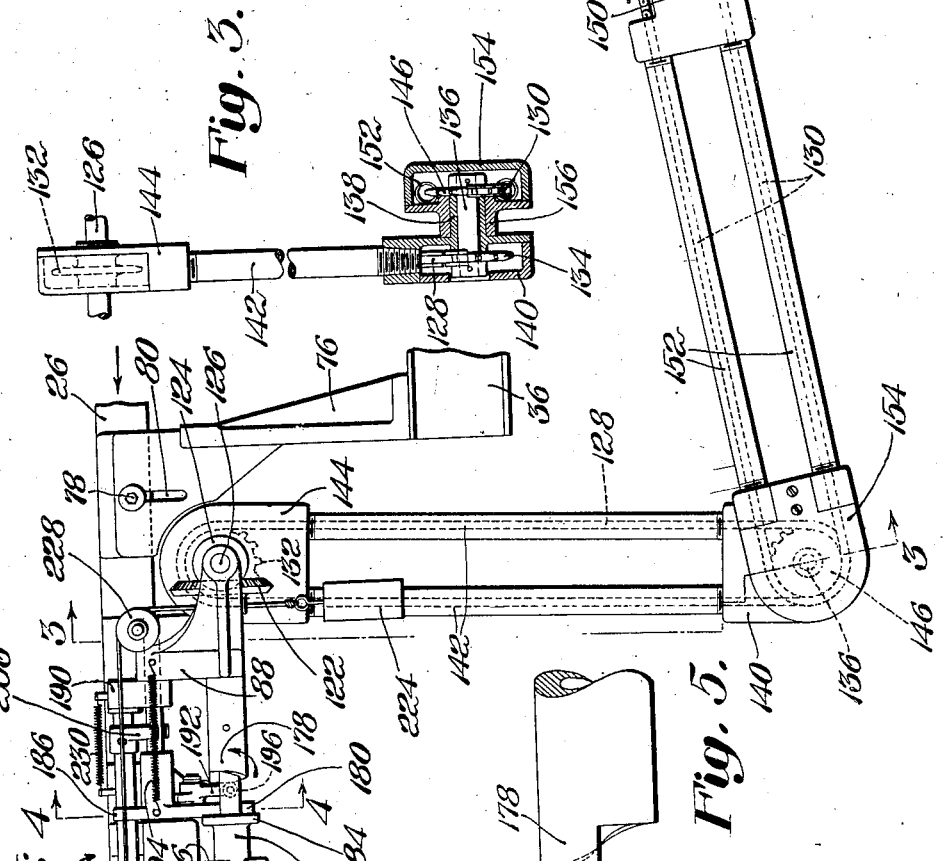
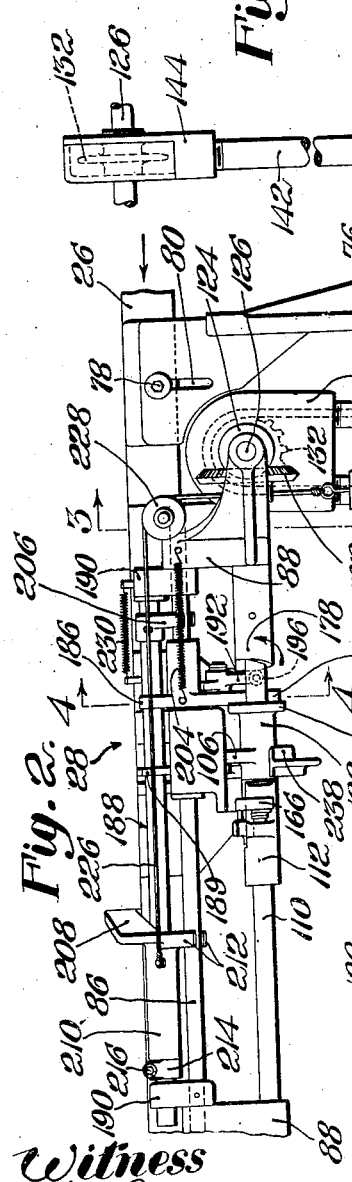
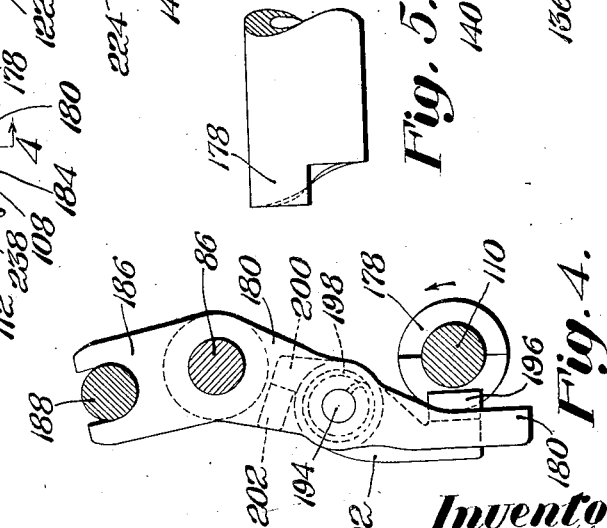
Witness  
H. C. Bowser
Inventor  
Erastus E. Winkley

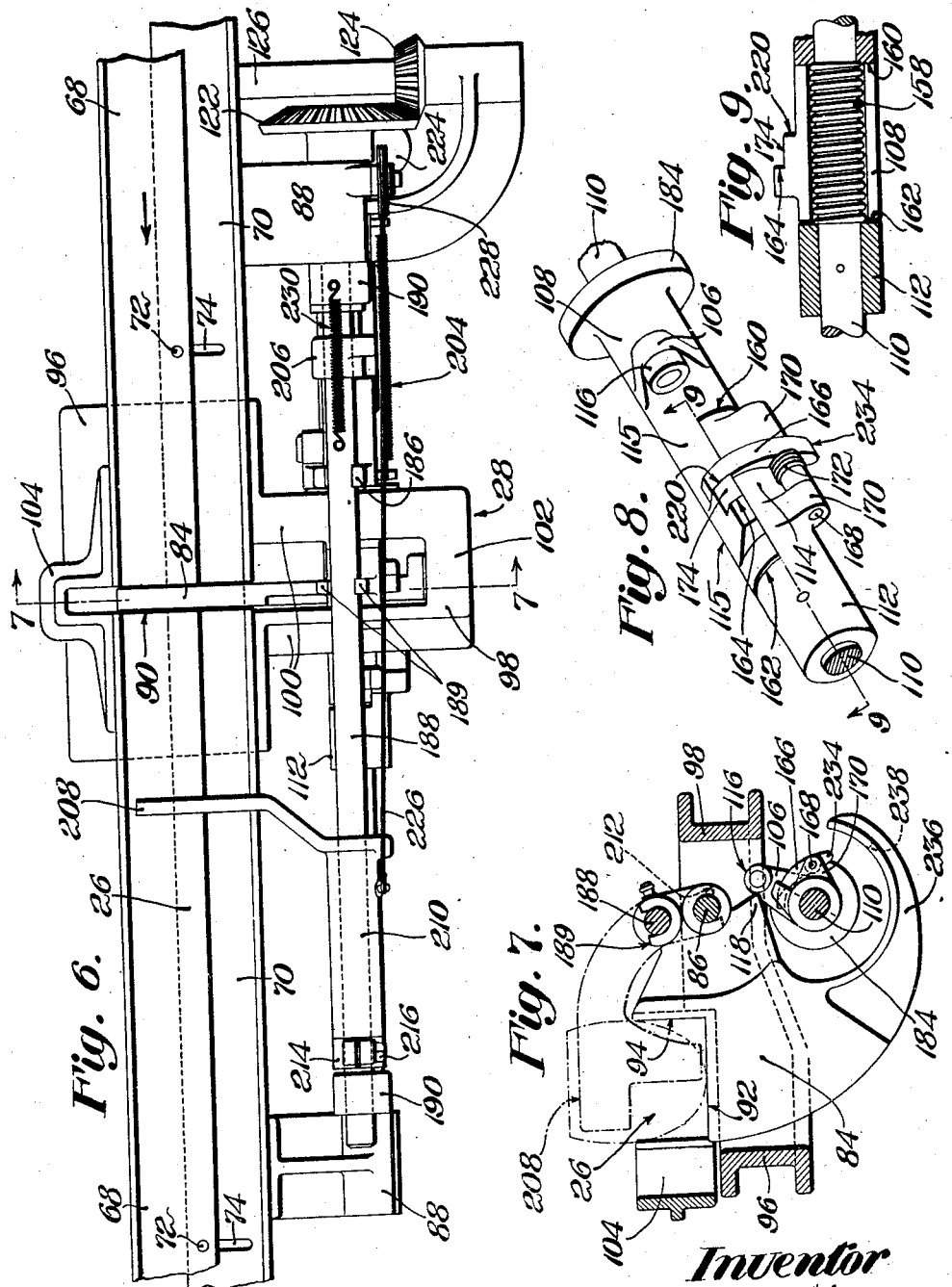

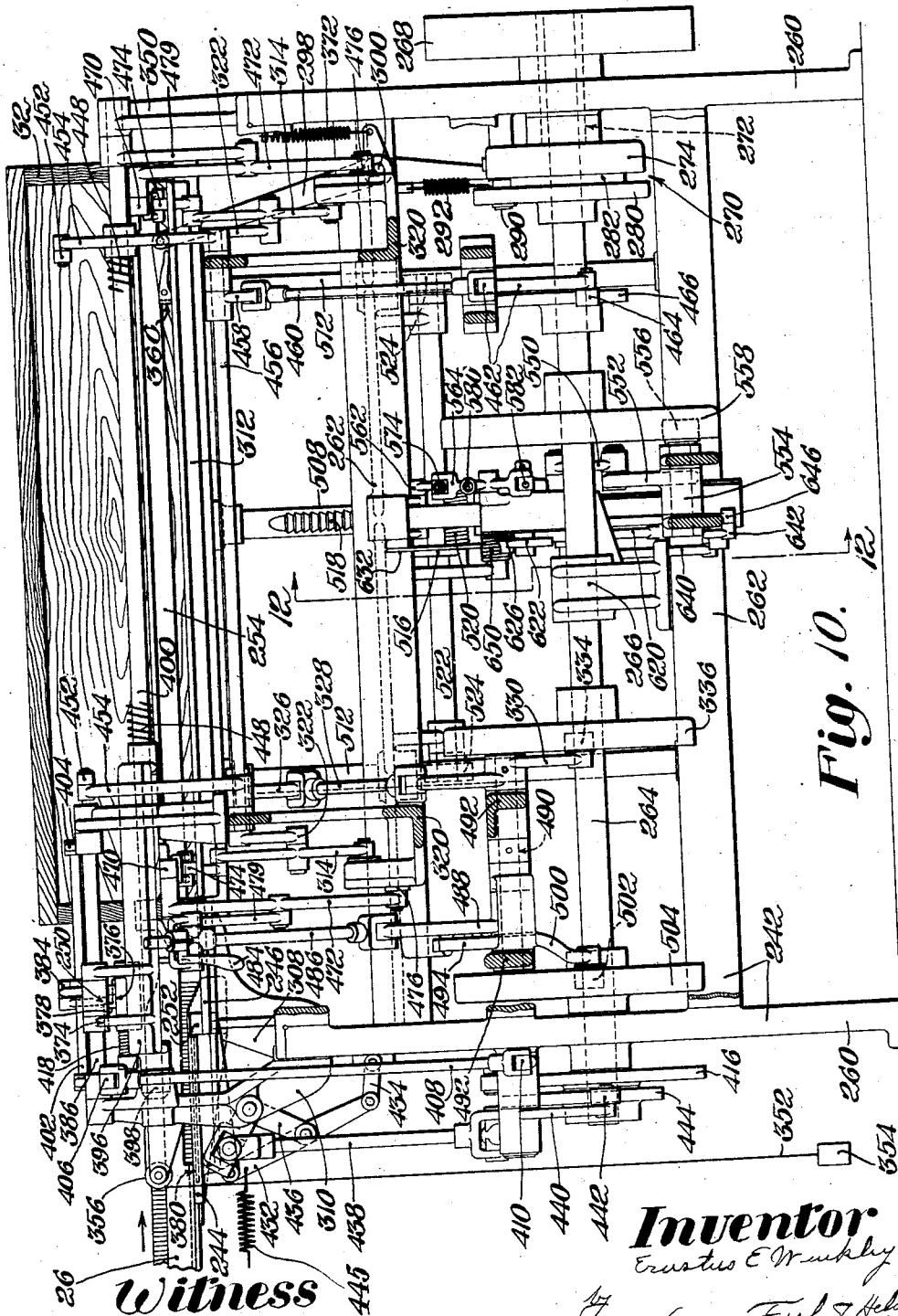

Aug. 24, 1926.                                    1,596,914
E. E. WINKLEY
STOCK HANDLING MACHINE
Filed May 26, 1920    9 Sheets-Sheet 8
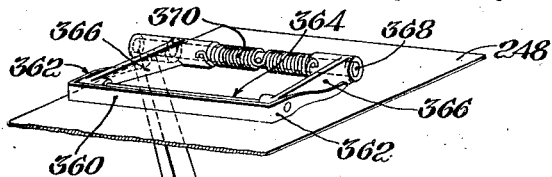
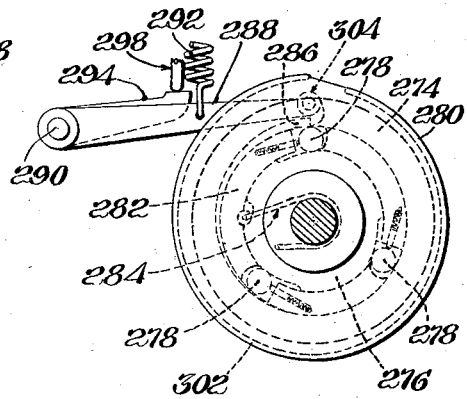
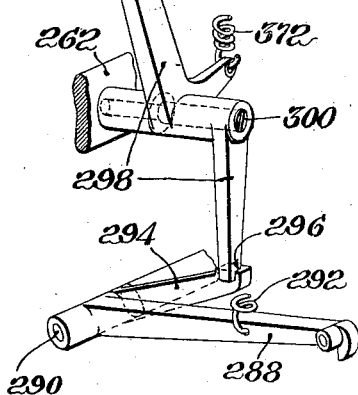
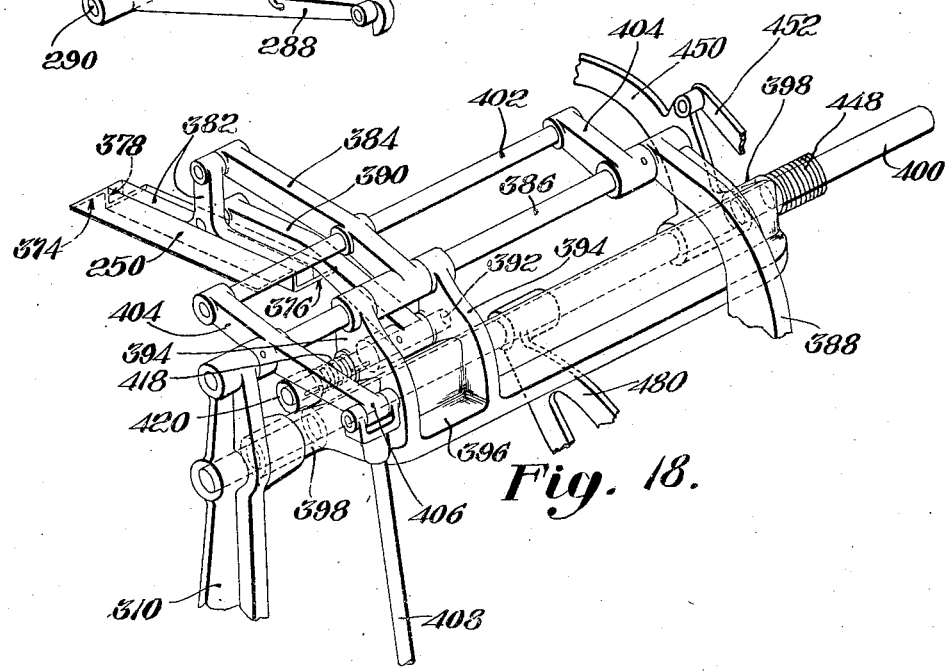

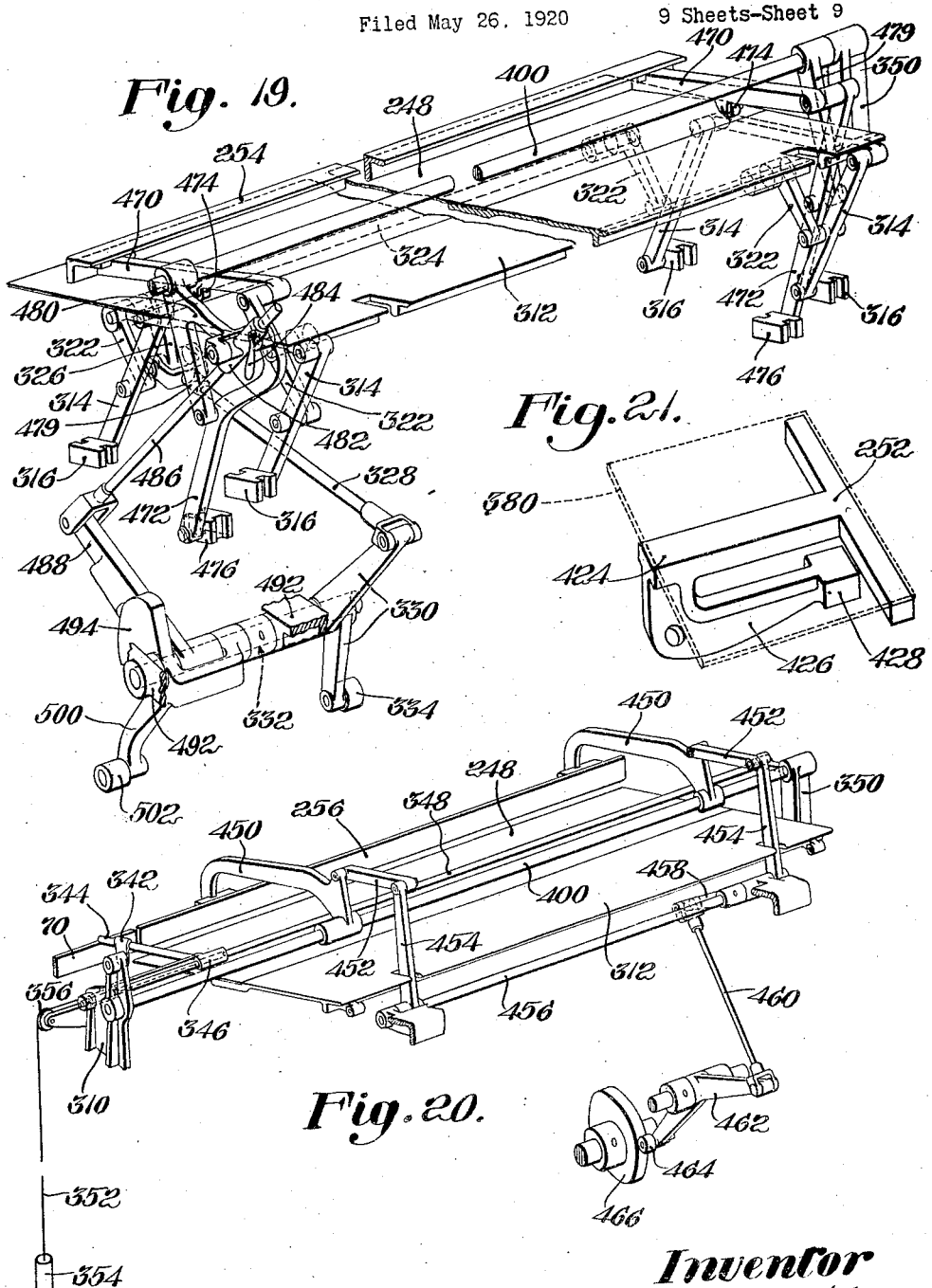

Patented Aug. 24, 1926.

1,596,914

UNITED STATES PATENT OFFICE.

ERASTUS E. WINKLEY, OF LYNN, MASSACHUSETTS, ASSIGNOR TO UNITED SHOE MACHINERY CORPORATION, OF PATERSON, NEW JERSEY, A CORPORATION OF NEW JERSEY.

STOCK-HANDLING MACHINE.

Application filed May 26, 1920. Serial No. 384,320.

This invention relates to machines for loading blanks into receptacles.

In the loading of blanks, such as heel lifts, into receptacles, it has heretofore been necessary to move the blanks one at a time to the receptacle, due to the difficulty in maintaining a number of the blanks in stacked formation during their transfer from the source of supply to the receptacle in which they are to be deposited.

It is an object of this invention to overcome the difficulty referred to by providing improved means for loading heel lifts or similar blanks in stacked formation into a storage receptacle such as an ordinary tray or box.

To this end, and in accordance with important features of the invention, means is provided for separating section after section of blanks from a stack of blanks moving from any suitable source of supply and, while separating the sections, maintaining them under pressure so that the blanks may be introduced into the receptacle in a manner to utilize all of the storage space therein. Preferably, too, and as illustrated, improved means is provided for lowering the receptacle step by step so that the blanks may be stored layer above layer within the receptacle. Further to facilitate its operation, in the operation of the illustrated machine, after the insertion of the last layer of blanks, the receptacle is returned at one step to its initial position where the loaded receptacle may be removed and an empty one substituted therefor. Also, in order to provide for the handling of blanks of different sizes, the machine shown in the drawings is provided with means for adjusting the mechanism which lowers the receptacle step by step, the same adjusting means also being operative to adjust the means for raising the receptacle to initial position.

Other objects of the invention and the features of construction by which they are attained will be set forth hereinafter in connection with the following description of the preferred embodiment of the invention illustrated in the accompanying drawings, in which:—

Figure 12:
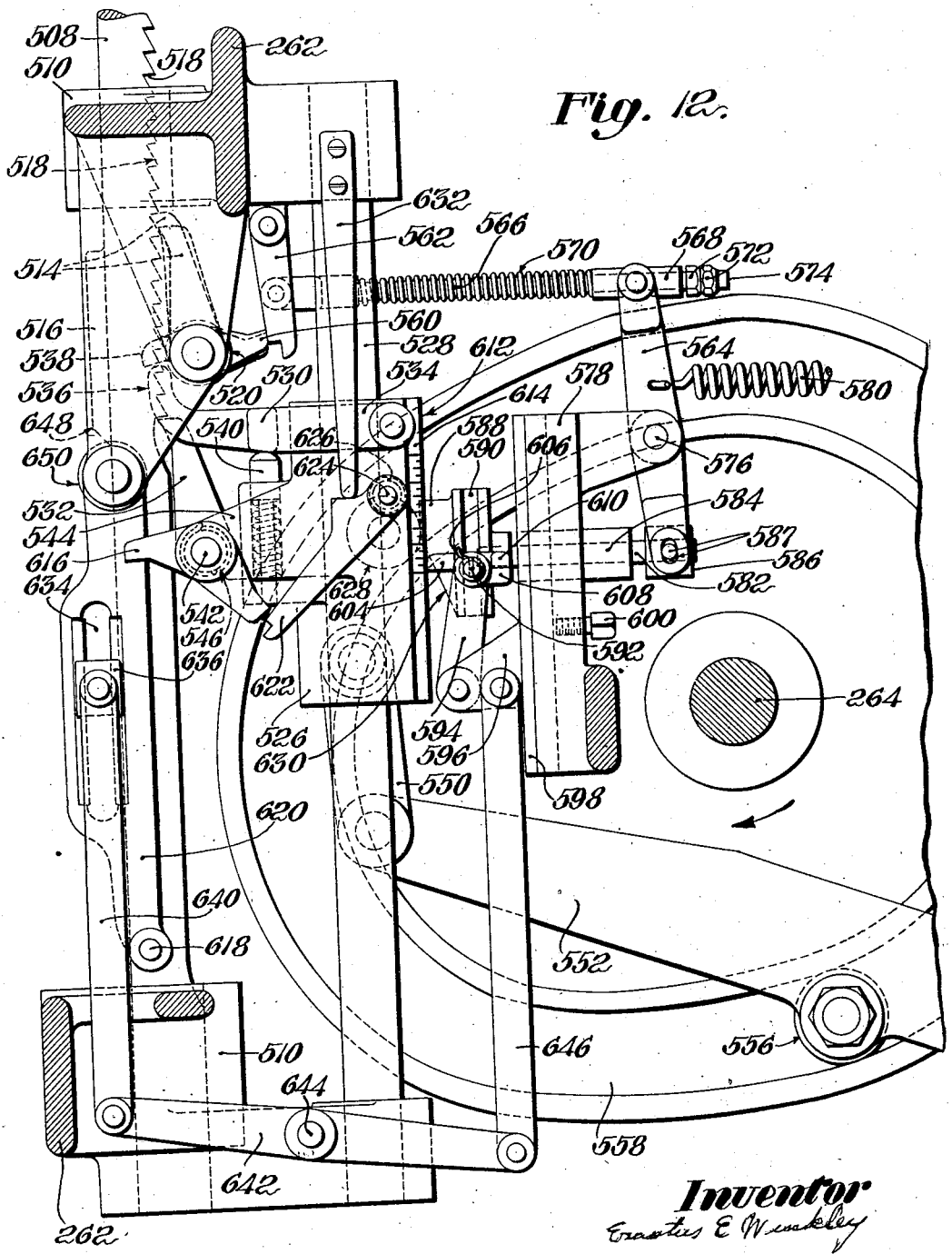
Figure 13:
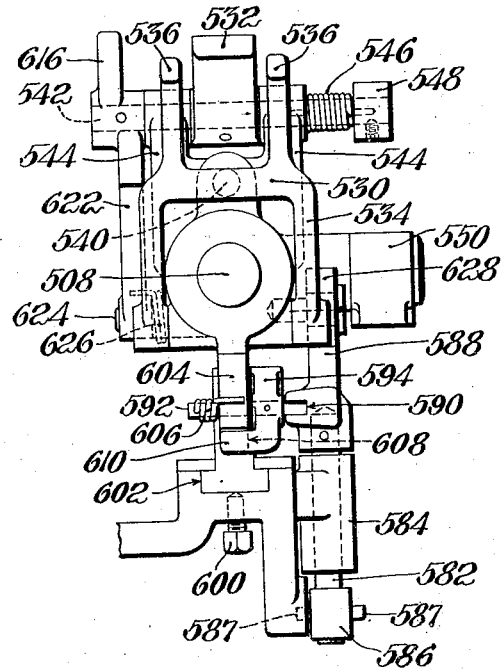
Figure 15:
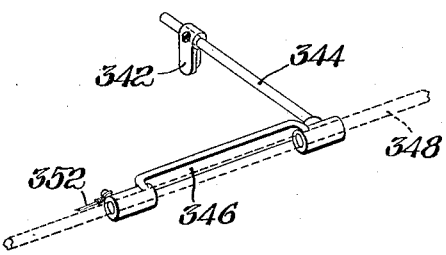
Figure 14:
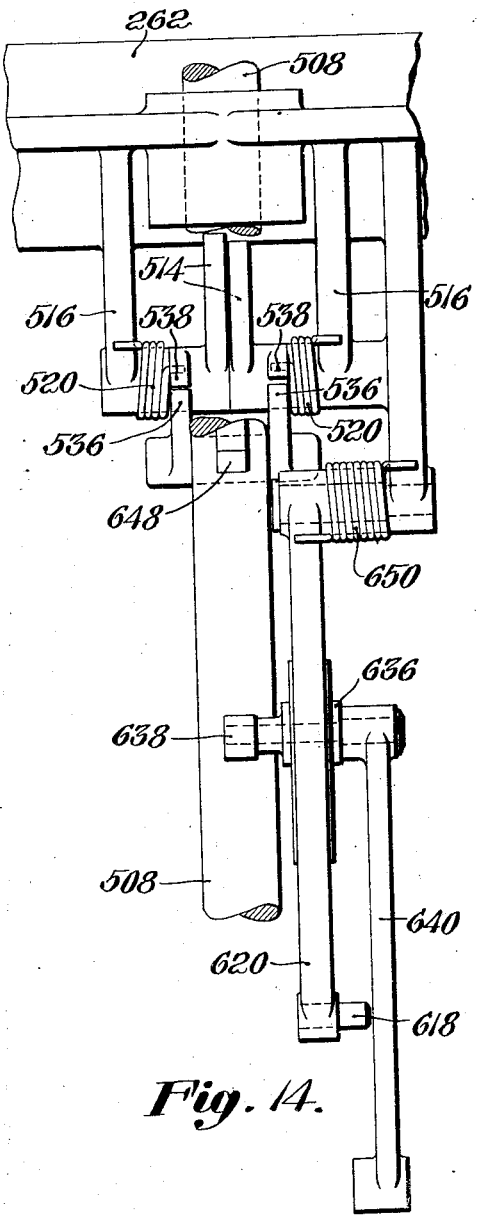

Figure 1 is a view in rear elevation of the entire machine; Fig. 2 is a view in front elevation, on an enlarged scale, showing the ejector mechanism for removing the imperfect blanks; Fig. 3 is a sectional view on the line 3—3 of Fig. 2; Fig. 4 is an enlarged sectional detail taken on the line 4—4 of Fig. 2; Fig. 5 is an enlarged detail view of one of the parts shown in Fig. 2; Fig. 6 is a top plan view, on an enlarged scale, of the ejector mechanism; Fig. 7 is a sectional view taken on the line 7—7 of Fig. 6; Fig. 8 is a perspective view of a portion of the ejector actuating mechanism; Fig. 9 is a detail sectional view taken on the line 9—9 of Fig. 8; Fig. 10 is a view in rear elevation of the loading mechanism, portions of the frame being broken away, to disclose operative parts otherwise obscured; Fig. 11 is a view in side elevation and on an enlarged scale, of the loading mechanism, looking from left to right in Fig. 10; Fig. 12 is an enlarged sectional view taken on the line 12—12 of Fig. 10, showing the mechanism for lowering and raising the receptacle in which the blanks are loaded; Figs. 13 and 14 are views in plan and front elevation, respectively, of the mechanism shown in Fig. 12; Fig. 15 is a perspective view of a portion of the loading mechanism; Fig. 16 is a detail view, in side elevation, of the clutch for connecting the loading mechanism with its source of power and disconnecting it therefrom; Fig. 17 is a perspective view of a device for automatically operating the clutch; and Figs. 18, 19, 20 and 21 are perspective views of different portions of the loading mechanism.

In its illustrated embodiment the invention comprises, in general, a stock-cutting or "dinking" mechanism 24 (Fig. 1) for cutting lifts from sheets or strips of stock; a chute 26 for receiving the lifts as they emerge from the cutting mechanism and maintaining them in stack formation; a lift removing mechanism 28 for removing the imperfect lifts from the stack in the chute 26; and loading mechanism 30 which is adapted to separate sections of perfect lifts from the leading portion of the stack and load them in a receptacle 32 which is associated therewith.

The stock-cutting mechanism 24 is of the same general construction and has the same mode of operation as the machine illustrated, described and claimed in United States Letters Patent No. 1,291,726, granted January 21, 1919, to W. C. Baxter, and assigned to the United Shoe Machinery Corporation. In the present machine, however, this mechanism 24 is so mounted as to receive and feed sheet material in a vertical plane instead of in a horizontal plane as in the machine of said patent, and the cutting instrumentalities of the present machine are arranged to operate upon the material thus fed so that the lifts cut therefrom will be forced through the die in a horizontal direction. In order to enable the invention to be better understood, certain portions of the stock-cutting mechanism 24 will be briefly described in this application. For a full and complete description of the parts of said mechanism, not fully described herein, reference may be had to said patent.

The operating parts of the stock-cutting mechanism 24 are carried by a head 34 (Fig. 1) that is supported upon a standard 36. A horizontal power shaft 38 is journaled in bearings on the standard 36 and continuously driven by a belt pulley 40. The shaft 38 is connected through intermeshing bevel gears 42 with a vertical main shaft 44. Projecting from the top of the vertical shaft 44 is an eccentric pin 46 which serves to reciprocate a pitman 48 that is connected to a plunger 50 having at its inner end a suitable holder in which is mounted a cutting-block 52. The plunger 50 reciprocates horizontally in a bearing 54 at the top of the head 34, moving the cutting-block 52 into and out of cooperative cutting relation with a die 56 which is removably secured to a suitable die-carrier, the latter being clamped to the head 34. The die 56 is open at both ends so that the lifts cut thereby may progressively pass in stack formation through the die into the chute 26 which is connected with the die so that the die and the chute provide a continuous guideway for the lifts.

The material to be operated upon is fed to the cutting instrumentalities by means of a pair of transversely grooved feed rolls 60 and 62 which are secured upon vertical shafts and are yieldingly pressed toward each other and driven, as described in the patent above referred to, in order that they may cooperate to intermittently feed the material as it is introduced between them. As also described in said patent, means is provided whereby the length of feed may be adjusted in accordance with the size of the die employed so as to normally advance the stock at each feed movement a distance equal to the width of the die. A pair of cooperating cutting disks 64 and 66 are secured to the upper ends of the shafts which carry the feed rolls 60 and 62, respectively, for the purpose of separating the strip of material, from which the lifts are immediately to be died, from the sheet of stock as the cutting operation proceeds.

The chute 26, into which the lifts advance as they emerge from the die, is in the form of an open trough and is constructed of a pair of angle-iron strips 68 and 70 (Fig. 6) which extend in a substantially horizontal direction and are arranged with their webs disposed in horizontal and vertical planes, the horizontal webs overlapping to form the bottom of the chute and the vertical webs forming the opposite sides thereof. The horizontal webs of the strips 68 and 70 are secured together by means of bolts 72 which extend through transverse slots 74 in one of said webs, the slots permitting the strips 68 and 70 to be adjusted toward and from each other to accommodate lifts of different sizes. The chute 26 is supported at its receiving end in a bracket 76 (Figs. 1 and 2), rising from the standard 36, by means of a suitable clamping device 78 extending through a vertical slot 80 in said bracket which permits upward or downward adjustment of the receiving end of the chute to bring it into registry with dies of different sizes. The opposite or delivery end of the chute 26 rests upon a stationary portion of the loading mechanism 30. The die 56 is so arranged that the lifts are cut with their breast edges uppermost and accordingly the lifts advance through the chute 26 with their curved rear edges resting upon the floor thereof, as indicated by broken lines in Fig. 7. It is obvious, however, that by slightly modifying the machine, it could be arranged to cut the lifts in any desired position, without departing from the spirit of the invention.

If imperfect lifts are cut they will of course be forced through the die and into the chute 26 with the perfect lifts. In order that perfect lifts only shall be loaded into the receptacle 32, the lift removing mechanism 28 is provided for removing the imperfect lifts from the chute 26 before the stack, which is being progressively built up in the chute, reaches the delivery end thereof and passes into the field of operations of the loading mechanism 30. To this end the lift-removing mechanism 28 comprises an ejector 84 (Figs. 6 and 7) a portion of which normally forms a section of the floor of the chute and is suddenly swung upwardly as the imperfect lifts are advanced into position above it, so as to eject said lifts from the chute. Since imperfect lifts can be cut only at the ends of the sheets of stock and the sheets are all of the same length, such lifts if present in the chute 26, will be located only at regular intervals therein, these intervals being determined by the thickness of the stock and the number of lifts which may be cut in a row extending lengthwise of the sheet. Accordingly the ejector 84 is actuated automatically, as will be hereinafter described, after each advance beyond the ejector of a section of the stack of sufficient length to contain a number of lifts which has been ascertained to be equal to the number of lifts which can be cut lengthwise of the sheet or strip of stock.

The ejector 84, as shown in Figs. 6 and 7, comprises a substantially flat wing-like member having an irregular marginal contour. The ejector is carried by a horizontal rock-shaft 86 that extends longitudinally in front of the chute 26, and is journaled in bearing brackets 88 projecting from the adjacent side wall of the chute. The ejector is disposed in a plane transverse to the rock-shaft 86 and the chute 26, and is adapted for vertical swinging movement through a narrow gap 90 in the chute. The upper portion of the ejector is provided with flat edge faces 92 and 94 (Fig. 7) which are disposed at right angles to each other. When the ejector is in its normal or lowermost position, these edge faces 92 and 94 form, respectively, sections of the floor and front side wall of the chute. In the construction shown, the width of the faces 92 and 94 of the ejector are substantially equal to the width of four lifts, so that four lifts will be removed from the chute at each operation of the ejector. This insures against failure of removing imperfect lifts due to slight inaccuracies of adjustment or irregularities of operation of the lift removing mechanism.

The chute 26 is supported on opposite sides of the gap 90 by means of the horizontal shelf-like portion 96 (Fig. 6) of a bracket 98 which is secured to the two sections of the angle-iron strip 70 and holds them in alinement. The bracket 98 is provided with a pair of horizontal arms 100 which extend forwardly on opposite sides of the ejector 84 and are apertured to permit the rock-shaft 86 to extend loosely therethrough. In front of the rock-shaft 86 the arms 100 are re-enforced by a connecting web 102. The two sections of the angle-iron strip 68, on opposite sides of the gap 90 are joined together in alinement, with each other by means of a yoke-shaped connecting member 104.

The ejector 84 is swung upwardly by means of an actuator 106 (Figs. 2, 7 and 8). The actuator 106 comprises an arm projecting from a sleeve 108 which is mounted with provision for longitudinal sliding movement on a continuously rotating horizontal shaft 110 that is journaled in the bearing brackets 88 beneath the rock-shaft 86. The actuator sleeve 108 is connected to rotate with the shaft 110 by means of a coupling member 112 which is fixed to the shaft 110 adjacent the actuator sleeve. The coupling member 112 comprises a sleeve having a longitudinal projection 114 that is formed by cutting away the material at one side of the axial plane of the sleeve adjacent one end thereof. The actuator sleeve 108 is provided with a similar projection 115. As shown clearly in Fig. 8, the actuator sleeve 108 and the coupling member 112 are assembled on the shaft 110 with their respective projections 114 and 115 overlapping. This construction permits the sleeve 108 to be rotated with the shaft 110 and also to be capable of being shifted longitudinally on the shaft. The actuator arm 106 carries at its free end a roll 116 which normally travels idly at one side of the ejector 84 as the shaft 110 rotates. At predetermined intervals, however, the roll 116 is caused, by the longitudinal shifting of the actuator sleeve 108 on the shaft 110 to cooperatively engage a cam lug 118 (Fig. 7) rearwardly projecting from the ejector so as to suddenly lift the ejector for the purpose of removing from the chute such lifts as may be located above the face 92.

The shaft 110 is continuously driven during the operation of the machine through intermeshing bevel gears 122 and 124, (Figs. 2 and 6) the former being secured to the shaft 110, and the latter to a transverse horizontal shaft 126 which is journaled in extensions of the bearing bracket 88. In order to permit vertical adjustment of the receiving end of the chute 26 in accordance with the size of the die employed in the cutting mechanism, the transverse shaft 126 is driven from the power shaft 38 by means of two sprocket chains 128 and 130 (Figs. 2 and 3). The sprocket chain 128 passes over a sprocket wheel 132 which is secured to the transverse shaft 126 and over a sprocket wheel 134 (Fig. 3), the latter being fast on one end of a shaft 136 that is journaled in a sleeve 138 integrally formed at one side of a sprocket wheel casing 140. The casing 140 is connected by means of two tubes 142, which enclose the parallel stretches of the chain 128, with a casing 144 which encloses the sprocket wheel 132 and is mounted to swing vertically on the shaft 126. The other sprocket chain 130 passes over a sprocket wheel 146 that is secured to the other end of the shaft 136, adjacent the outer end of the sleeve 138, and over another sprocket wheel 148 which is fixed on shaft 38 and enclosed in a sprocket wheel casing 150. The casing 150 is supported by means of a pair of tubes 152 which enclose the parallel stretches of the chain 130 and connect the casing 150 with a similar casing 154, the latter having a hub 156 (Fig. 3) which is journaled on the sleeve 138 of the casing 140. With this arrangement the transverse shaft 126 is permitted to move vertically with respect to the power shaft 128 as the elevation of the chute is adjusted, without interrupting the driving connections between said shafts.

Normally the ejector actuator 106 is positioned on the shaft 110 so that the roll 116 will not engage the cam lug 118 of the ejector 84 as said shaft rotates. To this end the actuator sleeve 108 is acted upon by a spring 158 (Fig. 9) which tends to move the sleeve 108 away from the coupling member 112. The spring 158 is coiled around the shaft 110 between opposed end faces 160 and 162 on the actuator sleeve 108 and coupling member 112 respectively (see also Fig. 8), the projections 114 and 115 of said members having their inner faces cut away to provide space for the spring. Sliding movement of the actuator sleeve 108, under the influence of the spring 158, is normally limited by the engagement of a stop shoulder 164 on the projection 115 of the actuator sleeve with the side of a latch 166, the latter being pivoted on a pin 168 that is secured in lugs 170 projecting laterally from the projection 114 of the coupling member 112. A light coiled spring 172 presses the latch 166 inwardly against a face 174 on the projection 115, adjacent the shoulder 164, thus holding the side of the latch 166 in engagement with said shoulder.

In order that actuator 106 may become operative to actuate the ejector, the roll 116 that is carried by the actuator must be brought into the vertical plane of the cam lug 118 on the ejector. To this end means is provided for shifting the sleeve 108, which carries the actuator arm 106, toward the coupling member 112, against the action of the spring 158. The means for shifting the sleeve 108 comprises a cam 178 and a shift-arm 180 (Figs. 2, 4 and 5). The cam 178 consists of a sleeve that is secured to the shaft 110 adjacent the bracket 88 and is provided with a cam face at the end remote from the bracket. The shift-arm 180 projects downwardly from a sleeve which is mounted for oscillatory and sliding movements on the rock-shaft 86 and is adapted to engage the outer side of an annular flange 184 that is formed at one end of the sleeve 108. The shift-arm 180 is normally maintained in a predetermined angular relation with respect to the shaft 110 by an upward extension 186 of said arm which is forked to embrace a horizontal guide-rod 188. The guide-rod 188 is supported at its opposite ends in a pair of brackets 190 (Fig. 2) which are secured to the rock-shaft 86, and the guide-rod is embraced by a forked portion 189 of the ejector 84. In order that the shift-arm 180 may be moved laterally on the rock-shaft 86 in a direction to slide the ejector actuator 106 on the shaft 110, a finger 192 (Fig. 4) is pivoted by means of a stud 194 to one side of the arm 180 and carries at its lower end a cam roll 196 which is adapted to be engaged by the end face of the cam 178. To this end a spring 198 surrounds the stud 194 and tends to swing the cam roll 196 forwardly toward the shaft 110 and to hold it in operative position adjacent the face of the cam 178. An upwardly extending lug 200 on the finger 192 is adapted to engage a stop lug 202 on the shift-arm 180 to limit the movement of the finger 192, under the influence of the spring 198, and prevent the flat end face of the cam roll 196 from being pressed against the shaft 110.

Normally the shift-arm 180 is held by means of a coiled spring 204 (Figs. 2 and 6) in such a longitudinal position on the rock-shaft 86 that the flat end face of the cam roll 196 engages the cylindrical surface of the cam 178 so that the shift-arm is unaffected by the rotation of the cam. Provision is made, however, for automatically sliding the shift-arm on the rock-shaft 86, against the tension of the spring 204, sufficiently to permit the finger 192 to be swung by its spring 198 into position to be engaged by the face of the cam 178. To this end the guide-rod 188 is adapted for longitudinal sliding movement in the supporting brackets 190 and a downwardly extending finger 206 (Figs. 2 and 6), is secured to said rod and forked at its lower end to straddle the rock-shaft 86, between the shift-arm and the adjacent bracket 190. The finger 206 is moved laterally, in a direction to slide the shift-arm against the tension of the spring 204, by means of a device which measures the advance of the stack in the chute 26 after each actuation of the ejector, and when the stack has moved a predetermined distance, operates to slide the guide-rod 188 in the direction of movement of the stack.

The device for measuring the advance of the stack in the chute 26 comprises a measuring finger 208, (Figs. 2, 6 and 7) which projects laterally from a sleeve 210 that is free to slide on the guide-rod. The measuring finger 208 consists of a slender, irregularly shaped member curving upwardly and rearwardly from the sleeve 210 and having a flat extremity which is adapted to enter the space in the stack left by the removal of lifts by the preceding operation of the ejector. A lug 212 projecting from the under side of the sleeve 210 is forked at its lower extremity to straddle the rock-shaft 86 and serves to determine the angular position of the measuring finger with respect to the guide-rod. Normally, as shown in Fig. 7, the measuring finger 208 extends transversely across the chute 26, in the path of the advancing lifts.

As the stack continues to advance in the chute 26, after the removal of a group of lifts by the ejector, the measuring finger 208 is advanced by the lifts behind it, the sleeve 210 sliding on the guide-rod 188. Just before the stack which is building up between the measuring finger and the gap 90 in the chute has increased sufficiently to contain the required number of lifts, the sleeve 210 engages a split collar 214 (Figs. 2 and 6) which is clamped by means of a bolt 216 to the guide-rod 188. Continued sliding movement of the sleeve 210 causes the guide-rod 188 to slide longitudinally in the bracket 190. The sliding movement of the guide-rod 188 will be transmitted to the shift-arm 180 by means of the forked finger 206 which is secured to said rod and straddles the rock-shaft adjacent the shift-arm. As the lateral movement of the shift-arm 180 moves the cam roll 196 beyond the face of the cam 178, the spring 198 forces the finger 192 forwardly so that the roll 196 is engaged by the face of the cam. Rotation of the cam 178 then moves the shift-arm 180 into contact with the adjacent side of the annular flange 184 at the end of the actuator sleeve 108, thus shifting the roll 116 into the vertical plane of the cam lug 118 on the ejector.

The actuator 106 is temporarily locked in operative position by means of the latch 166 which snaps behind a shoulder 220 on the actuator sleeve 108 as shown in Fig. 8. As the roll 116 on the actuator 106 strikes the cam lug 118, the ejector 84 is suddenly raised and the lifts, which are located directly above it in the chute 26, are ejected from the chute and fall to one side thereof where they may be collected in a suitable receptacle.

As the shaft is rocked to raise the ejector, the guide-rod 188 which is mounted in the brackets 190, is swung laterally about the axis of the rock-shaft, so that the measuring finger 208 is raised in unison with the ejector. The measuring finger moves upwardly until clear of the stack, whereupon it is restored to its normal longitudinal position with respect to the guide-rod 188 and into alinement with the ejector 84, by means of a weight 224 (Fig. 2) which is connected with the sleeve 210 by means of a cord 226 that passes over a pulley 228 on the bracket 88. As the measuring finger, after being withdrawn from the stack, moves toward the ejector under the influence of the weight 224, the guide-rod 188 is returned to its normal position, with the finger 206 in engagement with the adjacent bracket 190, by means of a spring 230, one end of which is secured to the guide-rod and the opposite end to the bracket 190.

The movement of the guide-rod 188, as it swings forwardly about the axis of the shaft 86, is communicated to the shift-arm 180 through the upward extension 186 of the latter, the shift-arm being swung rearwardly and the cam roll 196 withdrawn from engagement with the face of cam 178. The spring 204 then retracts the shift-arm, toward the right in Fig. 2, into normal position on the rock-shaft, the movement of the shift-arm being limited by means of the finger 206.

After the actuator roll 116 reaches the point of the cam lug 118 the ejector descends by gravity and the measuring finger follows it into the space once occupied by the ejected lifts. The return of the ejector turns the rock-shaft 86 in a counter clockwise direction, viewing Fig. 7, thus swinging the shift-arm forwardly. As the cam roll 196 is brought into engagement with the cylindrical surface of the cam 178 the spring 198 permits the shift-arm to continue its radial movement until restored to normal position.

The actuator 106 is restored to its normal longitudinal position on the shaft 110 before the ejector is returned to its normal position. For this purpose the latch 166 is provided with a tail 234 which is adapted to be engaged by the under side of the bracket 96 so that the latch is swung outwardly beyond the shoulder 220, thus permitting the spring 158 to shift the actuator sleeve 108 until the roll 116 is removed from the vertical plane of the cam lug on the ejector.

In order to insure that the ejector will be returned to normal position with the face 92 flush with the upper surface of the floor of the chute so as to offer no obstruction to the advance of the lifts through the chute, the ejector is provided with a curved depending extension 236 having at its free end a lateral offset which projects into the path of movement of the actuator roll 116 after the actuator has been restored to normal position on the shaft 110. If the ejector has not been completely returned by gravity by the time the actuator roll 116 reaches the lug 238 the roll will engage the lug and positively return the ejector and the measuring finger to their normal positions.

It will be seen that by measuring the length of the section of the stack which is permitted to advance beyond the ejector between successive operations of the latter, the ejector is caused to remove lifts at regular intervals throughout the stack. The length of said sections is determined by the location of the collar 214 on the guide-rod 188, and the collar is adjusted to render the ejector actuator operative when said section has increased in length sufficiently to contain the number of lifts which the strips of stock being operated upon are capable of producing. If the size of the die employed in the cutting mechanism is materially changed, of course a different number of lifts will be cut from the strips and the spacing of the intervals separating the imperfect lifts in the stack will of course vary accordingly. By loosening the bolt 216 and adjusting the collar 214 on the guide-rod 188, however, the space through which the measuring finger is permitted to move before the actuator 106 is rendered operative may be varied.

The lifts removed by the successive operations of the ejector, and which as before mentioned may be collected in a suitable receptacle will, of course, include some perfect lifts. These perfect lifts may be separated from the others by a sorting process and saved. Inasmuch as the quantity of lifts which will require assorting is very small in comparison with the entire quantity of lifts produced, the time required for the sorting process will be proportionally less than that which would be required for sorting all the lifts.

It is to be understood, that the invention is not limited to the removal by the ejector, of more than a single lift, since by accurately adjusting the lift removing mechanism, practical results might be obtained with an ejector so constructed that only as many lifts will be removed at each ejecting operation as are capable of being produced between the groups of perfect lifts.

While the ejector mechanism is described in detail in the foregoing parts of the specification, it is not claimed herein but is made the subject-matter of a divisional application upon which Letters Patent No. 1,513,779 was granted Nov. 4, 1924.

As the stack of lifts reaches the field of operations of the loading mechanism it still continues to advance by reason of the successive impulses imparted to it by the reciprocating cutting-block. After leaving the chute 26, the stack advances successively across two stationary platforms 244 and 246 and then across a receiver or table 248, which is normally held stationary to receive the lifts, but is adapted to move toward the receptacle 32, for the purpose of transferring the lifts thereto. The loading mechanism does not begin to operate under power until the leading end of the stack approaches the farther end of the receiving and transferring table 248. The cycle of operations of the loading mechanism is initiated at this time by means of a movement imparted to the trip-lever 298 by the stack in a manner hereinafter described.

The portion of the stack in the chute 26 which has been acted upon by the lift removing mechanism and from which the imperfect lifts have been removed continues to advance slowly through the chute as the newly cut lifts accumulate at the receiving end thereof. As the lifts emerge from the delivery end of the chute 26, they pass into the field of operations of the loading mechanism 30 by means of which they are loaded into suitable receptacles such as the receptacle 32. The loading mechanism 30 separates from the leading end of the stack successive sections, each of which is substantially equal in length to the length of the space within the receptacle, advances each section of the stack, in turn, in a lengthwise direction until it is located exactly opposite the vertically disposed open top of the receptacle, and transfers the sections laterally to the receptacle, depositing them therein in superimposed relation, in contact with the vertically disposed bottom wall, until a complete layer of stacked lifts has been packed into the receptacle. Each successive section of the stack is introduced laterally into the receptacle by a movement in the same horizontal plane and in order that the sections may be superimposed upon each other, the receptacle is initially supported in such a position that the first section will be deposited upon the lower horizontal side thereof, and the receptacle is lowered a distance equal to the vertical dimension of the sections after each section has been deposited therein. After the receptacle has been filled, the receptacle and its support are automatically raised to their initial elevations before the receptacle is ready to be removed. In this way the support will be positioned to support an empty receptacle which is to replace the loaded one, at the proper elevation for the reception of the first section of stacked lifts to be deposited therein.

The loading mechanism 30 comprises, in general, a frame 242 (Figs. 10 and 11) upon which the various parts and operating instrumentalities are mounted; two stationary feed platforms 244 and 246 across which the lifts successively advance after leaving the chute 26, the platform 246 being supported at a slightly lower elevation than the platform 244; an elongated transfer table or shelf 248 (Figs. 11, 19 and 20), normally positioned to receive the stacked lifts as they advance beyond the stationary platform 246; a separating device 250, operating after a section of the stack of predetermined length has been advanced beyond the platform 244 to depress the lifts immediately in advance of said platform into contact with the platform 246, thus separating said section from the rest of the stack; a horizontally reciprocating pusher 252 adapted to engage the face of the rearmost lift in the separated section of the slowly advancing stack and space said section ahead of the succeeding lifts, advancing it until it is resting throughout its entire length on the receiver or transfer table 248; a horizontal reciprocating transfer bar 254 which engages the rear side of the section on the table 248 and is advanced toward the receptacle, in unison with the table to transfer said section laterally to the receptacle 32; a horizontal guide-bar 256 (Figs. 11 and 20) which cooperates with the transfer bar 254 to guide the stack laterally as it advances in a lengthwise direction across the table 248, and which is subsequently lifted to permit the lateral transfer of said stack to the receptacle 32; and means including a vertically movable platform 258 (Fig. 11) for supporting and positioning the receptacle 32.

The frame 242 is substantially rectangular in form, comprising a pair of standards 260 (Figs. 10 and 11) which constitute the opposite ends of the frame, and suitable longitudinal frame members 262 extending horizontally at the front and rear of the operating mechanism and rigidly connecting the standards 260. The various operating parts of the loading mechanism are actuated by a plurality of cams which are secured to a cam shaft 264 which extends horizontally between the standards 260 and is suitably journaled in bearings in the standards and in an intermediate bearing bracket 266. The power for actuating the cam-shaft 264 is derived from a driving pulley 268 through a clutch 270 which is operable automatically at the proper time. The pulley 268 is secured to a sleeve 272 which surrounds the cam-shaft 264 and is continuously rotated. The clutch 270 is of the well known Horton type and is adapted to impart a single revolution to the cam-shaft and automatically bring the shaft to rest.

The clutch 270 comprises an outer member 274 (Fig. 16) which is secured to the sleeve 272, so that it rotates constantly, and an inner member 276 which is secured to the cam-shaft 264 and normally remains stationary. The inner clutch member is provided with the usual inclined recesses in which spring-pressed friction rollers 278 are seated. These rollers are controlled by a controller comprising a disk 280 (Fig. 10) which is loosely mounted on the cam-shaft and provided with a laterally extending sleeve 282 that is interposed between the outer and inner clutch members and is slotted to receive the friction rollers. A spring 284 connects the inner clutch member with the controller disk 280 and tends to rotate the latter in a direction to cause the friction rollers to act. The clutch is normally held out of operation, however, the controller sleeve 282 being provided for this purpose with a lug 286 which is adapted to be engaged by the hooked end of a detent arm 288 (see also Fig. 17) which is pivoted on a stud 290 projecting from the adjacent standard 260. The detent-arm 288 is urged upwardly by means of a spring 292 and is normally maintained in operative position, with its hooked end engaging the lug 286 on the controller sleeve, by means of an arm 294 that is integral with the detent-arm and is engaged by a shoulder 296 at the lower extremity of a trip-lever 298 the latter being fulcrumed on a stud 300 projecting from one of the longitudinal frame members 262. When the trip-lever is disengaged from the arm 294 the spring 292 withdraws the detent-arm from in front of the lug 286 and the clutch becomes operative to rotate the cam-shaft 264. The detent-arm 288 is automatically returned into position to disengage the clutch members so as to disconnect the cam-shaft from the sleeve 272 and arrest the rotation of the shaft after it has completed a single revolution, by means of an eccentric flange 302 which projects laterally from the marginal portion of the controller disk 280, as shown in Fig. 16, and is adapted to engage a cam-roll 304 on the detent-arm 288. Just before the completion of a single revolution of the cam-shaft the flange 302 returns the detent-arm 288 to normal position, with its hooked end in the path of the lug 286, in which position it is maintained by the engagement of the detent lever 298 with the arm 294. When the lug 286 engages the hooked end of the detent arm, the rotation of the controller disk 280 is arrested and the clutch members are disengaged. Inasmuch as the controller disk 280 is connected, through the spring 284 and the inner clutch member, with the cam-shaft, the latter is also brought to rest, the shock of the sudden stopping of the shaft being absorbed by said spring.

The stationary platform 244, which receives the stacked lifts as they leave the chute 26, consists of a rectangular piece of sheet material which is supported in a horizontal plane extending lengthwise of the stack. The edge of the platform 244, at the front side of the stack is rigidly secured to an arm projecting laterally from a bracket 308 which rises from the left hand standard 260, while the edge of the platform at the rear side of the stack is secured to the side of a bracket 310 rising from the same standard. The delivery end of the chute 26 is supported by the platform 244, the angle-iron strip 70, which constitutes the front side of the chute, being suitably secured to said platform and the angle iron strip 68, forming the rear side of the chute, being unsecured to the platform in order that it may be readily adjusted toward and from the strip 70 to vary the width of the chute. The floor of the chute terminates at or slightly in advance of the end of the platform which is nearer the lift-removing mechanism, permitting the lifts to be discharged from the chute upon said platform. The sides of the chute, however, extend beyond the platform 244 as far as the delivery end of the platform 246, for the purpose of guiding the stack as it advances across both of said platforms.

After leaving the platform 244, the lifts advance across the platform 246 and across the receiving table 248 until a section of the stack of the proper length to be loaded into the receptacle 32 has been advanced beyond the forward edge of the platform 244. At that time the stack has not reached the farther end of the table 248. It is then necessary to space the measured section of the stack ahead of the slowly following section in order that the table 248 and transfer bar 254 may have time to load said measured section laterally into the receptacle 32 and return to normal position before the leading end of the following stack has advanced into the field of operation of said transfer members. The required spacing operation is performed by the pusher 252 and in order that the rear of the measured section may be engaged by the pusher, the platform 246 is arranged to support the lifts at a somewhat lower elevation than the platform 244.

The stationary platform 246 is rectangular in form and is supported in advance of the platform 244 and at a slightly lower level by means of the bracket 308. As shown clearly in Fig. 10, the arrangement of the platforms 244 and 246 is such that the delivery end of the former slightly overlaps the receiving end of the latter and the pusher 252 is normally retracted between the overlapping ends of the platform. With the two platforms thus arranged a section of the stack of proper length to be loaded into the receptacle 32 may be measured by the advance of the stack beyond the front edge of the platform 244 and the rearmost lifts of said section will be permitted to extend below the portion of the stack on the platform 244 and into the path of the pusher 252.

After leaving the stationary platform 246, the lifts pass upon the table 248, which is normally held stationary in alinement with the platform 246, in order to receive the lifts. The table 248 comprises an elongated rectangular strip (Figs. 19 and 20) of sheet material which supports the lifts and which projects forwardly from a supporting carriage 312. The carriage 312 is also of rectangular form and is supported with provision for straight line reciprocating movement in a horizonal plane for the purpose of transferring the lifts supported thereby to the receptacle 32.

As best shown in Fig. 19, the means for supporting the carriage 312 comprises a plurality of floating arms 314 which are severally pivoted at their upper ends to the carriage adjacent its four corners. Each arm 314 is pivotally connected at its lower end to one of a plurality of slide-blocks 316, which are adapted for vertical sliding movement in guideways 318 (Figs. 10 and 11) that are formed in a pair of transverse frame members 320 extending between the upper longitudinal frame members 262 at the front and rear of the loading mechanism. The weight of the table 248 and carriage 312 is sustained by means of four arms 322 which are severally pivotally connected at their lower ends to the floating arms 314, at points midway between the ends of the latter. At their upper ends the supporting arms 322, which are connected with the rearward pair of floating arms 314, are pivotally mounted in upward extensions of the transverse frame members 320. The upper ends of the supporting arms 322, which are connected with the forward pair of floating arms 314, are secured to a rock-shaft 324 that is journaled in the upward extensions of the transverse frame members 320. The arms 322 are held in supporting position by means which also serves to actuate the rock-shaft for the purpose of reciprocating the carriage 312 and the shelf 248 and comprises the following members. Secured to one end of the rock-shaft 324 is a depending arm 326 (Fig. 19) which is connected by means of a rod 328 to the upper end of a cam lever 330. The cam lever 330 is secured to a rock-shaft 332 that is journaled in bearings supported by the adjacent frame standard 260. The lower end of the cam lever 330 carries a cam roll 334 which rides in a groove in a cam 336 (Fig. 10) that is secured to the cam-shaft 264. By means of the cam 336 and the above described connections between the cam and the carriage 312, the table 248 is reciprocated, as will be explained later, and it is also rigidly supported at all times in a horizontal position.

As the stack of lifts slowly advances, it is guided laterally by means of the transfer-bar 254, which is located at the rear side of the stack, and by the guide-bar 256, which is located at the front side of the stack. The transfer-bar 254 and the guide-bar 256 constitute vertically disposed guiding walls for the opposite sides of the stack which are normally in alinement with the corresponding side walls of the chute 26 and which extend throughout the entire length of the table 248. Inasmuch as the transfer-bar 254 is to be moved horizontally in unison with the table 248 for the purpose of transferring the stack laterally to the receptacle 32, and the guide-bar 256 must be raised to permit the stack to pass beneath it, these members are supported with provision for such movements, respectively, in a manner which will be hereinafter set forth in connection with the description of their operation.

During the advance of the stack across the table 248, the lift at the leading end of the stack is supported in an upright position by means of a traveling end-support 342 (Figs. 11, 15 and 20). The end-support 342 comprises a flat plate which is adapted to engage the face of the endmost lift of the stack and which advances with the stack across the table 248. For this purpose the end-support 342 is adjustably secured to a finger 344 which projects laterally from a carriage 346 (Fig. 15). The carriage 346 is adapted to slide on a horizontal guide-rod 348, one end of which is supported in the bracket 310, while the other end thereof is supported in a corresponding bracket 350 rising from the opposite standard 260. During the advance of the stack, as the carriage 346 slides on the guide-rod 348, the free end of the finger 344 slides upon the top edge of the guide-bar 256, the latter preventing the end-support 342 from engaging the table 248. In order that the end-support 342 may be yieldingly held against the leading end of the stack as the latter advances across the table 248, the carriage 346 is connected by means of a cord 352 with a weight 354, the cord passing over a pulley 356 on the bracket 310 and the weight tending to move the end-support in a direction opposite to that in which the stack advances.

As the leading end of the slowly advancing stack nears the farther edge of the table 248 it engages an abutment 360 (Figs. 10 and 17) which is carried by the trip-lever 298 which controls the operation of the clutch 270. As best shown in Fig. 17, the abutment 360 comprises a thin strip which extends transversely across the table 248 and is supported so as to present its face to the advancing stack. For this purpose the opposite ends of the abutment 360 are bent at right angles to form laterally offset extensions 362 which are directed away from the stack. The abutment 360 is pivotally connected to the trip lever 298 by means of a rod 364 which extends through the extensions 362 and through a pair of arms 366 which are in turn pivoted upon a horizontal rod 368 that is carried by the trip-lever 298. The trip-lever 298 rises in front of the table 248 to a point just above the top surface thereof. The pivot rod 368 projects rearwardly from the upper end of the trip-lever and overlies the table. A spring 370, which is coiled around the pivot rod 368, tends to depress the arms 366 so that the abutment 360 will slide in contact with the top of the table as it is displaced by the advancing stack. The abutment extensions 362 are adapted to engage the table on the opposite side of the pivot rod 364 from the central portion of the abutment, so that the lift engaging face of the abutment will be maintained at all times perpendicular to the top surface of the table.

As the abutment 360 is displaced by the advance of the stack across the table 248, the trip-lever 298 is swung about its fulcrum stud 300, against the action of spring 372, one end of which is attached to the trip-lever and the opposite end to a fixed part of the frame. The trip-lever is normally maintained, by means of a spring 372, with the abutment 360 in position shown in Fig. 10 and with the lower extremity of the trip-lever holding the detent arm 288 depressed so that the clutch 270 is inoperative and the cam-shaft 264 at rest. Upon a slight displacement of the abutment 360 by the stack, the shoulder 296 on the trip-lever is withdrawn from the arm 294 that is integral with the detent arm 288 and the latter is raised by the spring 292 so that its hooked end is withdrawn from in front of the lug 286 on the clutch controller 280. The clutch 270 then becomes operative and the cam-shaft 264 starts to rotate, in the direction of the arrow in Fig. 11, thus starting the cycle operations of the loading mechanism. This occurs when the portion of the stack which has been fed beyond the stationary platform 244 has become of sufficient length to be transferred to the receptacle 32.

When the loading mechanism begins to operate under power a continuous stack of lifts extends from the chute 26 across the stationary platforms 244 and 246 and across the table 248 as far as the abutment 360 which has been displaced only a slight amount beyond the position in which it appears in Fig. 10. Inasmuch as the stack was advanced across the table 248 against the pull of the weight 354 acting through the traveling end support 342 as above described, the lifts are now held closely together throughout the entire length of the stack and where the stack passes from the leading end of the stationary platform 244 to the lower level of the stationary platform 246, the stack gradually adjusts itself to the difference in elevation between the two stationary platforms. In other words, as the lifts leave the platform 244, they do not drop immediately so that their lower edges come in contact with the top of the platform 246, but the drop occurs gradually as the frictional resistance tending to prevent relative movement of the lifts is slowly overcome by gravity. As a result the upper and lower sides of the stack are curved substantially as shown in Fig. 10, leaving a space between the platform 246 and the lower edges of the lifts immediately in advance of the platform 244.

It is now necessary to depress the lifts which are immediately in advance of the platform 244 in order that the rearmost of said lifts may be engaged by the pusher 252 and the measured portion of the stack spaced ahead of the following portion until the former rests throughout its entire length on table 248. The means for depressing these lifts and thus separating from the stack a section of the proper length to be loaded into the receptacle 32, comprises the separator plate 250.

The separator plate 250 (Figs. 10, 11 and 18) consists of two flat rectangular portions 374 and 376 which are offset in parallel planes on opposite sides of a relatively narrow perpendicularly disposed connecting portion 278. As shown in Fig. 10, the separator plate is arranged with the portions 374 and 376 disposed in horizontal planes extending transversely above the adjacent portions of the stationary platforms 244 and 246, respectively. The separator plate is adapted to be depressed to force the lifts immediately in advance of the platform 244 downwardly toward the platform 246, thus levelling the curved section of the stack and effecting the separation of the portion which is to be transferred to receptacle 32 from the rest of the stack. The difference in elevation between the portions 374 and 376 of the separator plate is slightly less than the difference in elevation between the two stationary platforms 244 and 246. Accordingly, when the separator plate is depressed, the higher portion 374 will engage the top edges of the lifts on the platform 244 and arrest the downward movement of the separator plate. Thus, while the lifts that are engaged by the lower portion 376 will be depressed into the path of the pusher 252, they will not be pressed into actual contact with the platform 246, but will be free to be advanced by the pusher. When the separated section of the stack is advanced by the pusher 252, the connecting portion 378 of the separator plate, which is vertically disposed in front of the foremost lift on the platform 244, serves as an end-support to prevent said lift and those behind it from tipping forwardly.

During the time that the pusher 252 is in its advanced position the leading portion of the slowly advancing main stack is supported by an auxiliary platform 380, which is normally located beneath the stationary platform 244, as shown in dotted lines in Fig. 10, which advances with the pusher 252 and forms a temporary extension of the stationary platform. During the advance of the main stack across the auxiliary platform 380 the separator plate is held depressed and advances with the stack to support the leading end thereof, while the stack is resting upon the platform 380.

In order that the separator plate 250 may be depressed and may also be moved bodily with the advancing stack, the plate is mounted with provision for vertical swinging and horizontal sliding movements. To this end the separator plate, as best shown in Fig. 18, is secured to the horizontal cross-bar of an inverted T-shaped carrier 382, the vertical arm of which is pivoted at its upper end to the forward extremity of a supporting arm 384. At its opposite end the arm 384 is loosely mounted for swinging and lateral sliding movements upon a rock-shaft 386 which is journaled at one end in the bracket 310 and at its opposite end in a bracket 388 rising from a fixed portion of the frame. In order that the separator plate may be maintained with the lift engaging portion 374 and 376 horizontal, as the plate moves downwardly, a guiding arm 390 is pivoted at one end to the separator plate carrier 382 by means of a stud that is arranged in vertical alinement with the pivotal connection between the supporting arm 384 and said carriage. The opposite end of the guiding arm 390 is secured to a stud-shaft 392 which is disposed in vertical alinement with the rock-shaft 386 and is mounted to turn in a pair of ears 394, rising from an elongated carriage 396. The carriage 396 is adapted, by means of a pair of bearing sleeves 398 at its opposite ends, to slide on a horizontal rod 400 which extends longitudinally above the plane of the transfer table 248 and is supported at its opposite ends in the brackets 310 and 350 (Fig. 10). The bearing sleeves 398 are widely separated to facilitate the sliding of the carriage on the rod 400 and the rock-shaft 386 as the separator plate is advanced with the stack. The carriage 396 is prevented from turning on the rod 400 by means of upward extensions of the ears 394 through which the rock-shaft 386 extends on opposite sides of the arm 384.

The separator plate 250 is depressed and raised by means comprising an actuating rod 402 which extends loosely through the supporting arm 384 and is secured at its opposite ends in a pair of arms 404 which are pinned to the rock-shaft 386, one of said arms adjacent each of the brackets 310 and 388. The arm 404, adjacent the bracket 310, is provided with a rearward extension 406 which is pivotally connected by a rod 408 with the rear end of a cam lever 410 (Figs. 10 and 11) that is fulcrumed on a stud 412 projecting outwardly from the adjacent standard 260. At its forward end the cam lever 410 carries the cam roll 414 which rides upon the periphery of an edge cam 416 that is secured to the cam-shaft 264. The separator plate is urged downwardly by means of a spring 418 (Fig. 18) which is coiled around a portion of the stud-shaft 392 which projects beyond the outer side of one of the supporting ears 394 of the carriage 396, one end of the spring being secured to said ear 394 and the opposite end to a collar 420 which is fixed to the stud-shaft. The spring 418 serves also to hold the cam-roll 414 against its cam. Immediately after the start of each cycle of operations the cam 416 permits the spring 418 to depress the separator plate against the top edges of the lifts beneath it.

As soon as the separator plate has operated to separate the section of the stack which is in advance of the platform 244 from the rest of the stack by depressing the lifts which are immediately in advance of the forward edge of said platform, the pusher 252 is actuated to space said portion of the stack away from the following section and to advance the rear end of the separated section upon the transfer table 248. The pusher 252, as shown in Fig. 21, comprises a reciprocating member consisting of a T- shaped upper portion 424 which is disposed in a horizontal plane and is adapted to slide across the top face of the platform 246, and a lower portion 426 which is adapted to slide beneath the said platform. The cross arm of the T-shaped upper portion of the pusher which is adapted to engage the stack is disclosed at the advancing end of the pusher and extends transversely across the platform 246. The longitudinal arm of the T-shaped portion is connected at the end remote from the cross arm with the lower portion 426, the latter extending parallel with said longitudinal arm and terminating in a shoe 428 which is adapted to slide in a longitudinal guideway 430 (Fig. 11) on the under side of the platform 246.

As shown in Figs. 10 and 11, the pusher 252 is actuated by means comprising a link 432 which is pivoted at its upper end to the rear extremity of the lower portion of the pusher and at its lower end to a shorter link 434, the latter being in turn pivoted to a bracket on the standard 260. At a point near the middle of the link 432 the latter is pivoted to the downwardly extending arm of a bell-crank lever 436 which is fulcrumed at one side of the bracket 310. The other arm of the bell-crank lever 436 is connected by means of a universal joint with the upper end of a rod 438. The lower end of the rod 438 is connected by a universal joint to one arm of a bell-crank lever 440 which is fulcrumed on the stud 412. The other arm of the bell-crank lever 440 carries a cam roll 442 which rides on the periphery of an edge cam 444 which is secured to the cam shaft 264 alongside of the cam 416. The cam 444 operates to actuate the pusher 252, immediately after the downward movement of the separator plate, to advance the rear end of the separated section of the stack upon the transfer table 248. By means of the operative connections above described, the pusher 252 is constrained to reciprocate in a horizontal path.

The auxiliary platform 380 which supports the foremost lifts of the main portion of the stack while the pusher 252 is in its advanced position comprises a thin rectangular strip of such size that it may normally be retracted beneath the platform 244. The platform 380 rests upon and is rigidly secured to the T-shaped upper portion 424 of the pusher 252 so that it may reciprocate therewith.

The pusher 252 remains in its advanced position to serve as an end-support for the rearmost lifts on the table 248 until the table and the transfer bar 254 have advanced the stack laterally so that it is partially, at least, within the receptacle 32 and the endmost lifts are supported by the end walls of the latter. The cam 444 then permits the return of the pusher 252 to its normal retracted position through the operation of a spring 445 (Figs. 1 and 10) and the cam 416 permits the spring 418 to lower the separator plate. A spring 448 which surrounds the rod 400, between the separator carriage and a suitable abutment on the rod, then operates to return the separator plate to its normal position.

After the separated section of the stack has been advanced by the pusher 252 it is positioned on the receiving and transferring table 248 opposite the receptacle 32 and ready to be laterally transferred thereto. The abutment 360 has been pushed practically to the end of the table so that the upper end of the trip-lever 298 no longer rises between the table and the receptacle 32. The stacked lifts on the table 248 are now supported at one end by the pusher 252 and at the opposite end by the abutment 360. The opposite sides of the stack are supported with the edges of the lifts in alinement between the guide-bar 256, at the front side of the stack, and the transfer bar 254 at the rear side thereof.

Before the stack can be transferred laterally to the receptacle 32, the guide-bar 256 must be removed from in front of the stack. The guide-bar 256 is accordingly supported with provision for upward, edgewise movement by means of two arms 450 (Figs. 11 and 20) which extend upwardly and rearwardly from the points adjacent the opposite ends of the guide-bar and are mounted on the rod 400.

In order that the guide-bar 256 may be raised or lowered, the supporting arms 450 are severally connected by means of links 452, which are pivoted to said arms at points above the rod 400, to the upper ends of a pair of substantially vertical arms 454 which are secured at their lower ends to a rock-shaft 456 that is suitably journaled in bearings on the upper rear frame member 262. The rock-shaft 456 is actuated by means comprising an arm 458 which is pinned to the rock-shaft and is connected by means of a link 460 with the rearwardly extending arm of a cam lever 462 which is fulcrumed in a bracket projecting inwardly from said frame member 262. A cam roll 464 carried by the opposite arm of the cam lever 462 is held by the weight of the guide-bar 256 against the periphery of a cam 466 which is pinned to the cam shaft 264. The cam 466 operates at each cycle of operations of the machine to raise the guide-bar 256 to permit the lateral transfer to the receptacle of the stack of lifts on the table 248 and to lower the guide-bar upon the return to normal position of the transfer table and transfer bar.

When the guide-bar is raised the finger 344 which carries the traveling end-support 342 and which rests during the advance of said support upon the upper edge of the guide-bar is tilted upwardly about the rod 348 upon which it is mounted, thus lifting the end-support 342 above the top of the stack. As the end-support 342 rises clear of the stack, the pull of the weight 354 causes the carriage 346 to return toward the left in Fig. 10. As the carriage 346 moves above the top of the stack the finger 344 passes beyond the guide-bar 256 whereupon the finger, being then unsupported at its free end, swings downwardly, bringing the end-support into the plane of that portion of the stack which is advancing across the platform 244. The end-support is then brought into engagement with the foremost lift of the advancing stack to support it during its advance.

The stack on the table 248 is transferred to the receptacle 32 by the simultaneous advance into the receptacle of the transfer table 248 and the transfer bar 254. The receptacle 32 is supported upon the platform 258 so that the table 248 upon is first advance toward the receptacle enters the latter just above its lower side wall which rests upon said platform. The table 248 is reciprocated into and out of the receptacle 32 by means already described.

The receptacle 32, as shown in Fig. 11, is supported in front of the transfer table 248 with one side resting on the platform 258, the bottom wall being vertically disposed and the open top directed toward the loading mechanism, so that the stacks may be introduced into the receptacle by lateral movement in a horizontal direction. The platform is provided with a narrow flange 259 which rises vertically adjacent the front and end edges of the platform to engage the corresponding walls of the receptacle and prevent forward or endwise displacement of the latter. The platform 258 is initially so positioned that the transfer table 248, upon its first advance into the receptacle, will enter the latter just above the side wall which rests upon said platform. The stacks are introduced into the receptacle by simultaneous movements of the transfer table and transfer bar, the latter moving until the advance side of the stack is brought into contact with the vertically disposed bottom wall of the receptacle.

In order that the transfer bar may move toward and from the receptacle in a horizontal plane with its front face perpendicular to the top of the transfer table it is supported in the following manner. At its opposite ends the transfer bar 254 is secured to the forward extremities of two substantially horizontal arms 470 (Fig. 19), the rear ends of which are pivotally connected to the upper ends of a pair of links 472. The transfer bar is supported at a slight distance above the surface of the transfer table by means of rollers 474 which are severally mounted on the under sides of the arms 470. The lower ends of the links 472 are severally pivoted to slide-blocks 476 which are mounted to slide in ways 478 (Fig. 11) in the cross-bar 320. The links 472 are severally pivoted, substantially at their middle portions, to the lower ends of a pair of arms 479 which are loosely hung on the rod 400 and sustain the weight of the links. The link 472 which is nearer the stationary platform 246 is bent rearwardly to avoid striking said platform as it swings forwardly to advance the transfer bar.

The transfer bar is reciprocated by means comprising an arm 480 that is formed integrally with the arm 479 at the left end of the loading mechanism, so that said arms constitute a bell-crank lever. The arm 480 is forked to embrace a sleeve 482 to which the opposite sides of the forked arm are pivoted. The sleeve 482 is split at one end, as shown in Fig. 10, and may be adjustably secured, by means of a suitable hand-screw 484, to a rod 486 which connects the arm 480 with an arm 488, the latter being mounted for vertical oscillating movement on a shaft 332 that is journaled in bearings 492 supported by the frame. The arm 488 is oscillated by means of a segment 494 which is pivotally mounted on the shaft 332 alongside the arm 488, and which is connected with the latter by a yielding coupling. The yielding coupling is so constructed and arranged that the arm 488 may be rocked yieldingly in a direction to advance the transfer bar 254 and positively in the opposite direction to return the bar. The yielding coupling comprises a spring-pressed plunger 496 which is mounted on one side of the arm 488 and is adapted to engage a V-shaped notch 498 in the periphery of the segment 494. The segment 494 is further provided with a lateral lug 499 which projects into the plane of oscillation of the arm 488 and engages the arm when the plunger is in the notch. The segment 494 is actuated by a downwardly extending arm 500 carrying a cam-roll 502 which enters a groove in a cam 504 (Fig. 11) that is secured to the cam-shaft 264.

The cam 504 oscillates the segment 494 forwardly through a distance that is somewhat more than sufficient to advance the stack into position against the vertically disposed bottom wall of the receptacle. In order to permit the movement of the transfer bar to be arrested, when the stack has been thus positioned, without injury to the lifts or to the actuating mechanism, the plunger 496 rides out of the notch 498, thus disengaging the yielding coupling, and the continued forward movement of the segment is idle. Upon the oscillation of the segment 494 in a rearward direction, however, when the notch 498 comes into position beneath the plunger 496 the lug 499 on the segment engages the edge of the arm 488 and further movement of the segment in this direction is transmitted positively through said lug to the arm 488 to return the transfer bar to its retracted position.

By loosening the hand-screw 484 and shifting the sleeve 482 on the rod 486 the normal position of the transfer bar 254 with relation to the guide-bar 256 may be varied to accommodate stacks of different widths. In order to properly position the stack on the transfer table, it is desirable to have the transfer bar adjusted so that it will normally be in exact alinement with the rear side wall of the chute 26. In case, however, it is not carefully adjusted, but is normally located too far away from the guide-bar 256, the yielding coupling in the transfer bar actuating mechanism insures that the stack will be properly advanced into engagement with the vertically disposed bottom wall of the receptacle. By means of the yielding coupling, also, the necessity of readjusting the transfer bar for slight variations in the widths of the lifts operated upon is obviated.

After a stack of lifts has been loaded into the receptacle 32 by means of the concurrent advancing movements of the transfer table 248 and the transfer bar 254, the transfer bar remains in its advanced position within the receptacle, while the table is being withdrawn by means of its cam 336. In this way the stack is prevented from being retracted with the table, but is stripped therefrom and deposited on the lower side wall of the receptacle with one side of the stack resting against the front wall thereof. The transfer bar is then retracted by means of the cam 504 into its normal position in substantial alinement with the rear side wall of the chute 26.

In order that the next stack which is to be loaded into the receptacle may be superimposed upon the stack which has already been deposited therein provision is made for automatically lowering the receptacle upon the withdrawal therefrom of the transfer table and the transfer bar. To this end the platform 258, upon which the receptacle rests, is supported by a central post 508 (Figs. 10 to 14 inclusive) which extends through guideways 510 that are formed on the adjacent upper and lower longitudinal frame members 262. At its opposite ends, the platform 258 is further supported by means of a pair of posts 512 which extend through suitable guideways on said frame members. The weight of the platform 258 and the receptacle 32 is normally sustained by means of a pair of holding pawls 514 (Figs. 12 and 14) which are pivoted side-by-side between a pair of ears 516, depending from the adjacent frame members 262. The holding pawls 514 are adapted to engage ratchet teeth 518 which are formed on the central post 508. The holding pawls 514 are normally held in engagement with the supporting post 508 by springs 520 which severally surround the hubs of the pawls. The holding pawls are of unequal length, the longer extending beyond the shorter by a distance equal to one half the space between the ratchet teeth 518 on the post 508 for the purpose of permitting a finer adjustment of the elevation of the receptacle. The posts 512 at the opposite ends of the supporting platform 258 are connected to move vertically in unison, so as to maintain the platform in a horizontal position, by means of a horizontal rod 522 (Fig. 11) that is journaled in bearing brackets depending from the upper of said frame members and to the opposite ends of which are secured a pair of pinions 524 which severally engage racks 526 on said posts. The means for lowering the platform 258 comprises a carriage or sleeve 526 which is mounted to reciprocate upon a vertical guide-rod 528 which is located behind the supporting post 508 and is secured at its upper and lower ends in lugs projecting rearwardly from the adjacent frame members 262. The carriage 526 carries a dog 530 for the purpose of disengaging the holding pawl 514 from the ratchet teeth 518 and an actuating pawl 532 which is adapted to engage said ratchet teeth to sustain the weight of the platform 258 and the receptacle 32 when the holding pawl 514 is retracted into inoperative position.

As best shown in Figs. 12 and 13, the dog 530 for retracting the holding pawl 514 comprises a yoke 534 having rearwardly extending arms which embrace and are pivoted to the upper end of the sleeve or carriage 526. Extending forwardly from the yoke 534 are two parallel fingers 536 having upwardly curving extremities which are adapted to severally engage the under side of a pair of lugs 538, one of which projects forwardly from each of the holding pawls. The dog 530 is yieldingly supported, with the curved extensions of the arms 536 in position to engage the lugs 538, by means of a spring-pressed plunger 540 which is mounted in the carriage 526 and engages the under side of the transverse portion of the yoke 534.

The actuating pawl 532 extends upwardly from a rock-stud 542 that is adapted to turn in a pair of ears 544 which project forwardly from the carriage 526 on either side of the pawl. The actuating pawl is normally pressed forwardly against the post 508 by a spring 546 which is coiled about the stud 542, one end being secured to the adjacent ear 544 and the opposite end to a collar 548, which is secured to the stud.

In order that the carriage 526 may be moved downwardly on the guide-rod 528, it is connected by a link 550, which is pivoted to the lower end of the carriage, with a cam lever 552 which is fulcrumed between the arms of a bracket 554 (Fig. 10) on the lower rear longitudinal frame member 262. A cam roll 556 which is carried by the cam lever 552 enters a groove in a cam 558 that is secured to the cam-shaft 264.

After the transfer table 248 and the transfer bar 254 have been withdrawn from the receptacle 32, the platform 258 is actuated by means of the cam 558 for the purpose of lowering the receptacle into position for the next loading operation. In order that the holding pawls 514 may be retracted to permit the downward movement of the post 508, the cam 558 operates first to lift the carriage 526 slightly so that the operative holding pawl will be relieved of the weight of the receptacle 32 and the lifts which have been loaded therein. This load will then be sustained solely by the actuating pawl 532. The cam 558 is now ready to operate to lower the carriage 526 so that the post 508 will move downwardly with the actuating pawl 532. Assuming that the various parts are in the positions shown in Fig. 12, with the post 508 supported by the longer of the two holding pawls 514, the slight initial lifting of the carriage 526 immediately causes the actuating pawl 532 to lift the post 508 so that the holding pawls 514 are relieved of the weight of the receptacle 32. Thereupon the fingers 536 on the dog 530 engage the lugs 538 on the holding pawls and swing the latter rearwardly, against the action of the comparatively light springs 520, away from the ratchet teeth 518 until a pair of lugs 560 which severally project rearwardly from the holding pawls swing beneath the shouldered lower end of a detent finger 562 that is pivoted to a portion of the adjacent frame member 262. The detent finger 562 is thereupon swung, by means hereinafter described, in a direction to maintain the holding pawls in their inoperative positions. If, however, the post 508 is supported by the shorter of the two holding pawls 514, at the beginning of a cycle of operations, the fingers 536 on the dog 530 will be lifted into engagement with the lugs 538 on the holding pawls before the actuating pawl 532 operates to lift the post 508. The dog 530 is then permitted, by means of the spring pressed plunger 540, to yield downwardly until the post 508 has been lifted by the actuating pawl and the operative holding pawl is relieved of the weight of the receptacle. The carriage 526 then moves downwardly a predetermined distance under the influence of the cam 558 and the receptacle 32 is lowered.

In order that a new stack of lifts may be properly loaded into the receptacle 32 in superimposed relation to the stack previously loaded therein, it is necessary for the transfer table 248 to advance very closely above the top of the previously loaded stack. To permit the downward movement of the receptacle 32 to be arrested when it has been lowered sufficiently for the next advance of the transfer table and the transfer bar, provision is made for automatically disengaging the detent finger 562 from the lugs 560 on the holding pawls 514. To this end the detent finger 562 is connected with lever 564 by means of a yielding connection comprising a rod 566, one end of which is pivoted to the detent finger 562 while the opposite end thereof extends loosely through a sleeve 568 which is pivoted to the upper end of the lever 564. A spring 570 surrounds the rod 566, between the detent finger 562 and the sleeve 568, and the end of the rod which projects beyond the sleeve 568 is screw-threaded to receive a nut 572 by means of which the spring 570 is held under compression, so that it tends to swing the detent finger into operative position. The tension of the spring 570 may be readily adjusted by turning the nut 572 and a locknut 574 is provided for securing the nut 572 in adjusted position. The lever 564 is fulcrumed at 576 on a supporting plate 578 which projects upwardly from the bracket 266. The lever 564 is adapted to be actuated in a direction to disengage the detent finger 562 from the holding pawls by means of a coiled tension spring 580, one end of which is secured to a fixed part of the frame 242 and the opposite end to the lever 564 between its fulcrum and its pivotal connection with the sleeve 568.

During the downward movement of the post 508 with the carriage 526, the lever 564 is held in inoperative position, against the tension of the spring 580, by means of a horizontal slide-bar 582 which is mounted in a guideway 584 at one side of the supporting plate 578, the slide-bar having secured to its rear extremity a collar 586 that has a pin-and-slot connection 587, with the forked lower end of the lever 564. At its forward end the slide-bar 582 is provided with a head 588 having at one side a vertical groove 590. Projecting into the groove 590, is a stud 592 that extends transversely through the upper end of an upright arm 594, the latter being pivoted at its lower end to a forwardly projecting ear 596 on a plate 598 which is adjustably secured by means of a set-screw 600 in ways 602 (Fig. 13) that are formed in the front side of the supporting plate 578. Secured to the stud 592, adjacent to the arm 594 and the head 588 of the slide-bar 582 is a dog 604. The stud 592 is adapted to turn in the arm 594 and a spring 606 which is coiled about the projecting end of the stud tends to hold the dog in the position in which it appears in Fig. 12 with a tail 608 engaging the under side of a stop-lug 610 on the arm 594. The forward end of the dog is thus prevented from tilting downwardly and is held in engagement with a flat vertical face 612 that is formed at the rear side of the carriage 526, so long as said face is opposite the dog.

By means of the above described construction the arm 594, the slide-bar 582 and the lever 564 are held, against the tension of the spring 580, in the rearwardly displaced positions shown in Fig. 12. At this time the detent finger 562 is under pressure to cause it to move when permitted to engage over the tails 560 of the pawls 514 to hold them out of operative engagement with the ratchet teeth 518. When the top of the carriage 526 passes below the dog 604, however, the arm 594 and the slide-bar 582 are free to move forwardly and the spring 580, acting through the lever 564 and the rod 566, retracts the detent finger 562 to release the holding pawls 514. Thereupon one or the other of said pawls immediately engages one of the ratchet teeth 518 on the post 508 and the downward movement of the post is arrested. By loosening the set-screw 600 and adjusting the plate 598 vertically in the ways 602, the amount of downward movement of the post 508 and consequently, of the receptacle 32, may be regulated in accordance with the size of the lifts which are to be loaded into the receptacle. If desired, the adjustment of the plate 598 and the arm 594 may be determined by the relation of the dog 604 to the graduations of a scale 614 which may be provided on one side of the carriage 526 adjacent the face 612.

After the downward movement of the post 508 has been arrested, by means of one of the holding pawls 514, the actuating pawl 532 is caused to be retracted from operative position, in order to prevent the post 508 and the receptacle 32 from being affected by the following upward movement of the carriage 526. To this end the continued downward movement of the carriage, under the influence of the cam 558, causes the forward extremity of a rocker-bar 616, which is pinned to the stud 542 that carries the actuating pawl, to engage a pin 618 which normally is positioned in the path of said bar. The pin 618 projects laterally from the lower end of a vertical arm 620 that is pivoted at its upper end to an ear depending from the frame member 262 which supports the holding pawls. The pin 618 acts through the rocker-bar 616 to rock the stud 542 in a direction to disengage the actuating pawl 532 from the ratchet teeth 518. This movement of the rocker-bar 616 causes its rear extremity to swing below the shouldered lower end of a latch 622, which is pivoted by a stud 624 to the side of the carriage 526. A spring 626, which is coiled about the pivot stud 624, raises the shouldered end of the latch so as to hold the actuating pawl 532 in inoperative position.

During the final part of the cycle of operations of the loading mechanism, the cam 558 raises the carriage 526 to normal position. On the upward movement of the carriage, when the top of the carriage strikes the dog 604, the dog tilts upwardly against the action of the spring 606, permitting the carriage to rise above the dog. Just before the carriage reaches normal position a roll 628, which is carried at one side of the carriage 526, engages an inclined cam face 630 on the head 588 of the slide-bar 582, displacing the slide-bar rearwardly and swinging the lever 564 into position to permit the detent finger 562 to engage the holding pawls when the latter are disengaged from the ratchet teeth 518 at the next cycle of operations of the loading mechanism. As the head of the slide-bar is moved into its normal rearwardly displaced position by the roll 628, the dog 604 is returned by its spring 606 to normal position, with the tail 608 against the stop-lug 610. Upon the return to normal position of the carriage 526, a trip-finger 632, depending from the ear which supports the upper end of the vertical guide-rod 528, disengages the latch 622 from the rock-bar 616 and the actuating pawl is restored into engagement with the ratchet teeth on the post 508.

The receptacle 32 now being positioned to receive another stack of lifts, the transfer table and the transfer bar operate again, advancing a new stack into the receptacle and depositing it on top of the stack previously loaded therein. At the proper time in the cycle of operations of the loading mechanism, the receptacle 32 is again lowered the same distance as before; the loading of stacks and lowering of the receptacle occurring alternately, until the receptacle is filled. If large sized lifts are being operated upon, the receptacle may be filled after two stacks of such lifts have been deposited therein. If, however, smaller lifts are being produced by the cutting mechanism three or more stacks of such lifts may be required to fill the receptacle.

After the receptacle has been filled, it is desirable to automatically elevate the receptacle supporting platform 258 to its initial position which in the illustrative machine is also the discharge position or station for the filled receptacle, in order that an empty receptacle which is to replace the loaded one may be properly positioned to receive the first stack of lifts. To this end the arm 620 is provided with a longitudinal slot 634 in which is mounted a slide-block 636 carrying a roller 638 (Fig. 14). The slide-block 636 is adjustably supported in the slot 634 by means of a link 640, the upper end of which is pivoted to the slide-block; a lever 642 which is fulcrumed at 644 upon a portion of the lower front longitudinal frame member 262 and is pivotally connected at its forward end to the link 640; and a link 646 which connects the rear end of the lever 642 with the ear 596 on the plate 598. As the post 508 moves downwardly, a cam lug 648 on the front side of the post, is adapted to engage the roller 638 that is carried by the slide-block 636, thus swinging the arm 620 forwardly and withdrawing the pin 618 from the path of the rocker-bar 616. As a result the actuating pawl 532 is not retracted from the ratchet teeth on the post 508. Therefore, as the carriage 526 rises, the post 508 and the receptacle 32 which is supported thereby, is lifted with the carriage. Upon the upward movement of the post 508, when the cam lug 648 is retracted from the roller 638, a spring 650 returns the arm 620 rearwardly to normal position. The movement of the arm in this direction is limited by the engagement of the roller 638 with the post 508.

By means of the above described connections between the slide-block 636 and the plate 598, the position of the roller 638, relatively to the cam lug 648, is adjusted concurrently with the adjustment of the dog 604 with respect to the carriage 526; the roller 638 moving through the same distance as the dog 604 but in the opposite direction. This adjustment of the roller 638 insures that, irrespective of the size of the lifts being operated upon, the receptacle 32 will be filled with as many stacks of lifts as may be loaded one above another therein before the receptacle is returned to its initial elevation.

Although the loading mechanism has been described as operating upon stacks in which the component lifts are arranged with their curved rear edges lowermost, it is to be understood that said mechanism will operate equally well on stacks in which the lifts are otherwise arranged. Also, if desired, the lift cutting mechanism may be equipped with double dies so that two lifts may be cut at each reciprocation of the cutting block.

While it is preferred to employ the specific construction and arrangement of parts shown and described, it will be understood that this construction and arrangement is not essential except so far as specified in the claims, and may be changed or modified without departing from the broader features of the invention.

The invention having been described, that which is claimed as new is:—

1. The combination with a chute and means for delivering blanks to the chute in tightly stacked relation of means for successively removing sections of said stack from the chute and transferring said sections to a receptacle, and means movable with the on-coming stack for controlling its advancing end.

2. The combination with means for advancing blanks in the form of a stack, of means movable with the on-coming stack for successively separating from the stack sections thereof, and means for transferring said sections laterally to a receptacle.

3. The combination with means for advancing blanks in the form of a stack, of means for successively removing sections from the stack and loading the sections in a receptacle, said last-mentioned means comprising a separator operative to separate sections successively from the stack and to maintain the blanks at the end of the on-coming stack in proper stacked relation.

4. The combination with means for supporting a longitudinally advancing stack of blanks, of mechanism for transferring a section of said stack laterally to a receptacle, and means for retaining the blanks of the section under pressure to maintain the stacked relation of the blanks therein during transfer to the receptacle.

5. The combination with means for supporting an advancing stack of blanks, of mechanism for separating sections from said stack and transferring said sections to a receptacle, said mechanism comprising a movable transferring table with an abutment associated therewith against which each section is pressed in turn to locate one end thereof.

6. The combination with means for supporting an advancing stack of blanks, of means for successively separating from the stack sections of equal length and transferring them to a receptacle, said last mentioned means comprising a transferring table with an abutment associated therewith against which each section is pressed to locate one end thereof, and power means controlled by the abutment to cause operation of the table.

7. The combination with means for supporting stacks of blanks successively delivered thereto and transferring the stacks as they are received to a receptacle, comprising a transferring table, of means for separating each stack of blanks from a column of blanks comprising a member arranged to co-operate with the table to control the blanks as they move toward the receptacle.

8. The combination with means for supporting stacks of blanks successively delivered thereto and transferring the stacks as they are received to a receptacle, means for shifting the receptacle after each layer of blanks has been placed therein, means for returning the receptacle to initial position after it has been filled, and means for simultaneously adjusting both the shifting and the returning means.

9. Loading mechanism having, in combination, means for supporting a longitudinally advancing stack of blanks, means for separating successive sections from the stack and transferring them laterally to a receptacle, a member operative to hold the blanks stacked at one end of each section during lateral movement thereof, and power means controlled by said member for causing operation of the last-mentioned means.

10. Loading mechanism having, in combination, means for supporting a longitudinally advancing stack of blanks, means for separating successive sections from the stack and loading them into a receptacle in parallel rows, an abutment for locating each section in turn after its separation from the stack and for maintaining the blanks in stack relation, and power means controlled by the abutment for operating the last-mentioned means.

11. The combination with means for supporting an advancing stack of blanks, of mechanism for transferring sections of the stack to a receptacle, means for shifting the position of the receptacle between successive operations of the transfer mechanism to cause said section to be loaded in parallel rows in the receptacle, means for moving the filled receptacle to a discharge station, and means for effecting simultaneous adjustment of the two means for moving the receptacle.

12. The combination with means for supporting an advancing stack of blanks, mechanism for transferring sections of the stack to a receptacle, means for lowering the receptacle between successive operations of the transfer mechanism to cause said sections to be loaded in superimposed relation in the receptacle, means for moving the filled receptacle to a discharge station, and means for adjusting the lowering means of the receptacle, said last-mentioned means having connections to control the movement of the receptacle to the discharge station.

13. Loading mechanism having, in combination, a stationary support for a longitudinally advancing stack of blanks, a transversely movable support normally positioned to receive the leading portion of the stack as it advances beyond the stationary support, means for separating a portion of the leading end of the stack at a point on said stationary support and advancing it ahead of the rest of the stack until it rests entirely upon the movable support, and means for moving the movable support in a direction transverse to the length of the separated stack of blanks to transfer said separated stack to a receptacle.

14. Loading mechanism having, in combination, a support for a stack of blanks, a traveling end support for the stack of blanks as it moves lengthwise of the stack, a pusher adapted to transfer the stack laterally to a receptacle, power means for operating the pusher, and a member serving as an abutment for one end of the stack on the support after the removal of the traveling end support and operative to control the power means.

15. Loading mechanism having, in combination, a support for a longitudinally advancing stack of blanks, a pusher normally positioned to guide the stack as it advances on said support and operative to transfer the stack laterally to a receptacle, and a second pusher operative to advance the stack upon the support and to control the stack as it is being transferred by the first pusher.

16. Loading mechanism having, in combination, a support for a longitudinally advancing stack of blanks, means for engaging opposite sides of the stack to guide the stack as it advances on said support and for transferring the stack laterally to a receptacle, and a member movable to engage one end of the stack to keep the blanks in stacked relation while they are being transferred by said means.

17. Loading mechanism having, in combination, a support for a longitudinally advancing stack of blanks, means for engaging opposite sides of the stack to guide the stack as it advances on said support and for transferring the stack laterally to a receptacle, and means for laterally supporting the end-most blanks of the stack during the transferal thereof.

18. The combination with means for supporting an advancing stack of blanks, of mechanism for loading blanks from said stack into a receptacle comprising an initially stationary table for receiving sections of said stack, means cooperating with said table during movement thereof for delivering the sections to the receptacle and depositing them therein, and means for keeping the stack of blanks under endwise compression until its introduction into the receptacle.

19. The combination with means for supporting an advancing stack of blanks, of mechanism for loading blanks from said stack into a receptacle comprising an initially stationary table across which the leading portion of said stack is advanced, means for separating from the stack a measured section of the blanks at the forward portion thereof and advancing them to a position opposite the receptacle, and means cooperating with said table for introducing said sections into the receptacle and depositing them therein, and means for keeping the blanks in the section under compression from the time of its separation until it is deposited in the receptacle.

20. The combination with means for supporting an advancing stack of blanks, of mechanism for loading blanks from said stack into a receptacle comprising a table initially alined with the forward end of the stack supporting means to receive the leading portion of the advancing stack and adapted to be moved edgewise into the receptacle in a direction normal to the advance of said stack, means operating before the stack has advanced completely across the table for spacing in advance of the stack a section of the leading portion thereof substantially equal to the length of the receptacle, and means cooperating with the table for introducing said section laterally into the receptacle and depositing it therein.

21. Loading mechanism having, in combination, means for supporting a longitudinally advancing stack of blanks, a transfer table for receiving a section of the stack as it advances beyond said supporting means and transferring said section to a receptacle, and means operating before the transferal of said section to the receptacle for spacing the section to be transferred ahead of the following portion of the stack to permit the transfer table to transfer the section and to return to normal position before the following portion of the stack advances into its field of operations, said spacing means having a member which remains in contact with the section to guide it during movement to the receptacle.

22. Loading mechanism having, in combination, a stationary support for an advancing stack of blanks, a transfer table arranged to receive the blanks as they advance beyond said support, means for dividing the stack at a point on the stationary support and advancing the leading portion ahead of the following portion until the former is supported entirely by the transfer table, means for moving the table to transfer the portion of the stack supported thereby to a receptacle, and a member movable with the front end of the separated stack to keep the blanks properly stacked.

23. Loading mechanism having, in combination, a support for a longitudinally advancing stack of blanks, a second support arranged at a lower level to receive the blanks as they advance beyond the first support, a transfer table for receiving the blanks as they advance beyond the second platform, means for advancing the portion of the stack supported by the second platform and the table ahead of the following portion until it rests entirely upon the table, and means for moving the table to transfer the portion of the stack supported thereby laterally to a receptacle.

24. Loading mechanism having, in combination, a support for a longitudinally advancing stack of blanks, a second support arranged at a lower level to receive the blanks as they advance beyond the first support, a transfer table for receiving the blanks as they advance beyond the second platform, a pusher for advancing the portion of the stack supported by the second platform and the table ahead of the following portion until it rests entirely upon the table, means for depressing the blanks immediately in advance of the first platform into the path of the pusher, and means for moving the table to transfer the portion of the stack supported thereby laterally to a receptacle.

25. Loading mechanism having, in combination, a support for a longitudinally advancing stack of blanks, a second support arranged at a lower level to receive the blanks as they advance beyond the first support, means for depressing the blanks immediately ahead of the first support to separate a section at the forward end of the advancing stack from the following portion thereof, and means for loading the blanks into a receptacle including a pusher for engaging the rear of the separated section and advancing said section ahead of the rest of the stack.

26. Loading mechanism having, in combination, means for supporting a longitudinally advancing stack of blanks, means for separating a section at the forward end of the advancing stack from the following portion thereof, means for loading the blanks into a receptacle, and means for laterally supporting the foremost blanks of said following portion after a section has been separated therefrom.

27. Loading mechanism having, in combination, a support for a longitudinally advancing stack of blanks, a second support arranged at a lower level to receive the blanks as they advance beyond the first support, a transfer table for receiving the blanks as they advance beyond the second platform, a normally retracted pusher for advancing the portion of the stack supported by the second platform ahead of the following portion until it is entirely supported by the table, a normally retracted auxiliary platform adapted to be advanced to support the leading blanks of the following portion of the stack while the pusher is operating, and means for transferring the portion of the stack supported by the table to a receptacle.

28. Loading mechanism having, in combination, a support upon which blanks are to be loaded in stacked formation, a reciprocating table for supporting a stack of blanks at one side of said support and transferring them to a position above said support, a reciprocating transfer bar adapted to engage the side of the stack on the transfer table remote from said support, means for reciprocating the table and the transfer bar to advance them in unison toward the support, and to withdraw the table and the bar successively to cause the stack to be deposited upon the support, and means for causing endwise pressure upon the stack to keep the blanks in place during movement of the table.

29. Loading mechanism having, in combination, a stationary support for a stack of blanks, a transfer table normally located at one side of a receptacle for receiving blanks from the stack and transferring them to the receptacle, means for advancing a section of the stack upon the table, a guide-bar for engaging the side of said section opposite the receptacle, a transfer bar adapted to engage the opposite side of said section, means for withdrawing the guide-bar to permit the transfer of the section to the receptacle, means for advancing the table and the transfer bar in unison to transfer the stack to the receptacle, and means operative to keep the blanks properly stacked until delivered to the receptacle.

30. Loading mechanism having, in combination, a stationary support for a stack of blanks, a transfer table normally located at one side of a receptacle, means for advancing a section of the stack longitudinally upon the table, a guide-bar for engaging the side of the advanced section opposite the receptacle, a transfer bar adapted to engage the opposite side of said section, means for adjusting the normal position of the transfer bar relatively to the guide-bar to accommodate stacks of different widths, means for withdrawing the guide-bar to permit the transfer of the section to the receptacle, and means for advancing the table and the transfer bar in unison to transfer the stack laterally to the receptacle.

31. Loading mechanism having, in combination, a stationary support for a stack of blanks, a transfer table normally located at one side of a receptacle, and means for advancing a section of the stack until it rests entirely upon the table, for actuating the table to transfer said section to the receptacle and for laterally supporting the endmost pieces of the section until it reaches the receptacle.

32. Loading mechanism having, in combination, means for supporting a longitudinally advancing supply stack of blanks comprising two stationary platforms, one arranged in advance of the other and at a lower elevation, and a movable table initially maintained in advance of the lower platform; means operating upon the section of the stack in advance of the upper platform when the leading end thereof has reached a predetermined position on the table to advance said section ahead of the rest of the stack until it rests entirely on the table, and means for advancing the table to transfer said section laterally to a receptacle and for retracting the table to initial position before the advance of the supply stack beyond the lower platform.

33. In a machine adapted to receive a receptacle for holding blanks in multiple stack formation, the receptacle being disposed in position to receive stacks of blanks advanced laterally thereto in a substantially horizontal direction, a transfer mechanism for receiving sucessively supplied stacks of blanks and depositing them laterally in the receptacle, means operating automatically after a stack has been deposited in the receptacle for lowering the receptacle to permit the next stack received therein to be superimposed upon the previously received stack, means for moving the receptacle to a discharge station, and means for adjusting simultaneously the lowering and the moving means for the receptacle.

34. In a machine adapted to receive a receptacle for holding pieces of material in multiple stack formation, means for supporting the receptacle in initial receiving position, means for successively delivering stacks of said pieces to the receptacle, mechanisms for actuating the supporting means between successive operations of the delivering mechanism to permit the assembly of the stacks in parallel rows in the receptacle and for returning the receptacle to initial position after it has been filled, and means for effecting simultaneous adjustment of said mechanism.

35. The combination with means for supporting a receptacle so that stacks of blanks may be introduced laterally therein by movements in a substantially horizontal direction, of means for supporting an advancing supply stack of blanks, mechanism for successively transferring sections from said supply stack to said receptacle, and means for lowering the receptacle support between successive operations of the transfer mechanism to cause said sections to be superimposed in the receptacle and for automatically raising the receptacle support to normal position after the receptacle has been filled.

36. The combination with means for supporting a receptacle so that stacks of blanks may be introduced laterally therein by movements in a substantially horizontal direction, of means for supporting an advancing supply stack of blanks, mechanism for successively transferring sections from said supply stack to said receptacle, means for lowering the receptacle support between successive operations of the transfer mechanism, and means adapted to be set in accordance with the size of blanks being operated upon to arrest automatically the downward movement of the receptacle when it has been lowered a distance substantially equal to the vertical dimension of the stacks.

37. In a machine of the character described, a support for a stack of blanks along which the blanks are movable, and means for withdrawing the blanks laterally of the support operative to retain the blanks under pressure in a direction toward each other to insure their retention in stacked relation so as to facilitate subsequent operations thereon.

38. In a machine of the character described, a trough along which blanks in stacked relation are movable, a transferrer movable transversely of the trough for withdrawing a section of blanks from the line of feed, and means for engaging with the ends of the section to maintain the blanks in stacked relation.

39. In a machine of the character described, a trough having vertical sides for retaining blanks in stacked relation as they are moved along the trough, a transferrer having spaced flanges to be positioned in alinement with the trough sides for receiving therebetween blanks in stacked relation, and means for moving the transferrer to withdraw a set of blanks from the line of feed, and means to hold the blanks in stacked relation by engagement with the ends of the set.

40. In a machine of the character described, a support for a longitudinally advancing stack of blanks, a second support arranged at a lower level to receive the blanks as they advance beyond the first support, a normally retracted pusher for advancing the portion of the stack supported by the second support ahead of the following portion until it is spaced therefrom, an initially retracted auxiliary platform adapted to be advanced to support the leading blanks of the following portion of the stack while the pusher is operating, and means for transferring the separated section or stack to a receptacle.

41. In a machine of the character described a support for a longitudinally advancing stack of blanks, a separator means operative to divide a section from the advancing end of the stack, a pusher for advancing the separated section into spaced relation with respect to the following portion of the stack, and means for transferring the separated section or stack to a receptacle.

ERASTUS E. WINKLEY.